US 9,188,887 B2

(12) United States Patent
Hirata et al.

(10) Patent No.: US 9,188,887 B2
(45) Date of Patent: Nov. 17, 2015

(54) POLYCARBONATE COPOLYMER, COATING FLUID USING SAME, ELECTROPHOTOGRAPHIC PHOTORECEPTOR, AND METHOD FOR PRODUCING POLYCARBONATE COPOLYMER

(75) Inventors: Kengo Hirata, Sodegaura (JP); Hironobu Morishita, Sodegaura (JP); Takaaki Hikosaka, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 52 days.

(21) Appl. No.: 14/001,402

(22) PCT Filed: Feb. 21, 2012

(86) PCT No.: PCT/JP2012/054092
§ 371 (c)(1),
(2), (4) Date: Aug. 23, 2013

(87) PCT Pub. No.: WO2012/115088
PCT Pub. Date: Aug. 30, 2012

(65) Prior Publication Data
US 2013/0337373 A1 Dec. 19, 2013

(30) Foreign Application Priority Data

Feb. 24, 2011 (JP) ................. 2011-038496

(51) Int. Cl.
| C08G 64/00 | (2006.01) |
| G03G 5/147 | (2006.01) |
| C08G 63/64 | (2006.01) |
| C09D 169/00 | (2006.01) |
| G03G 5/05 | (2006.01) |
| G03G 5/153 | (2006.01) |
| C08G 63/02 | (2006.01) |

(52) U.S. Cl.
CPC ............ *G03G 5/14756* (2013.01); *C08G 63/64* (2013.01); *C09D 169/005* (2013.01); *G03G 5/0564* (2013.01); *G03G 5/0592* (2013.01); *G03G 5/0596* (2013.01); *G03G 5/14773* (2013.01); *G03G 5/153* (2013.01)

(58) Field of Classification Search
USPC .................................................. 528/196, 198
See application file for complete search history.

(56) References Cited

U.S. PATENT DOCUMENTS

| 8,519,082 B2* | 8/2013 | Hikosaka et al. ............. 528/196 |
| 2009/0326184 A1 | 12/2009 | Hikosaka et al. |
| 2010/0324209 A1 | 12/2010 | Hikosaka et al. |

FOREIGN PATENT DOCUMENTS

| CN | 101432336 A | 5/2009 |
| EP | 0 582 722 | 2/1994 |
| JP | 4 179961 | 6/1992 |
| JP | 5 70582 | 3/1993 |
| JP | 5-72424 | 3/1993 |
| JP | 8 27068 | 1/1996 |
| JP | 11 172003 | 6/1999 |
| JP | 2004 354759 | 12/2004 |
| JP | 2005 139339 | 6/2005 |
| JP | 2010 159422 | 7/2010 |
| JP | 2011 26574 | 2/2011 |
| WO | 2010 150885 | 12/2010 |

OTHER PUBLICATIONS

Office Action issued Oct. 28, 2014 in Chinese Patent Application No. 201280010377.4 (with English translation).
International Search Report Issued Mar. 27, 2012 in PCT/JP12/54092 Filed Feb. 21, 2012.
U.S. Appl. No. 14/405,595, filed Dec. 4, 2014, Hirata, et al.
Supplementary European Search Report issued Sep. 4, 2015, in European Patent Application No. EP 12 74 9924.

* cited by examiner

Primary Examiner — Terressa Boykin
(74) Attorney, Agent, or Firm — Oblon, McClelland, Maier & Neustadt, L.L.P.

(57) ABSTRACT

This invention relates to a polycarbonate copolymer having a structure formed of a repeating unit represented by the following formula (100):

$$\left\{ \left( O - Ar^1 - O - \underset{O}{\overset{\|}{C}} \right)_n O - Ar^2 - O - \underset{O}{\overset{\|}{C}} \right\}$$
(100)

in which a molar copolymer composition represented by $Ar^1/(Ar^1+Ar^2)$ is in a range of 50 mol % to 67 mol %, a reduced viscosity [ηsp/C] is in a range of 0.60 dl/g to 4.0 dl/g, and a ratio of a hydroxyl group in all ends is 20 mol % or less.

20 Claims, No Drawings

POLYCARBONATE COPOLYMER, COATING FLUID USING SAME, ELECTROPHOTOGRAPHIC PHOTORECEPTOR, AND METHOD FOR PRODUCING POLYCARBONATE COPOLYMER

This application is a 371 of PCT/JP2012/054092, filed Feb. 21, 2012. Priority to Japanese patent application 2011-038496, filed Feb. 24, 2011, is claimed.

TECHNICAL FIELD

The present invention relates to a polycarbonate polymer, a coating liquid using the same, an electrophotographic photoreceptor, and a manufacturing method of a polycarbonate copolymer.

BACKGROUND ART

A polycarbonate resin has been used as a material for molded products in various industrial fields because of its excellent mechanical characteristics, thermal characteristics and electrical characteristics. Recently, the polycarbonate resin has often been used in a field of a functional product requiring optical characteristics of the polycarbonate resin as well as the above characteristics. In accordance with such an expansion in application, the polycarbonate resin has been demanded to have a variety of performance.

The functional product is exemplified by an electrophotographic photoreceptor in which the polycarbonate resins are used as a binder resin for functional materials such as a charge generating material and a charge transporting material.

The electrophotographic photoreceptor has been demanded to have a predetermined sensitivity, electrical characteristics and optical characteristics in accordance with electrophotography process to be applied. A surface of a photosensitive layer of the electrophotographic photoreceptor is repeatedly subjected to operations such as corona electrification, toner development, transfer onto paper, cleaning and the like. Electrical and mechanical external-forces are applied on the surface of the photosensitive layer every time such operations are performed. Accordingly, the photosensitive layer provided on the surface of the electrophotographic photoreceptor is required to have durability against these external forces in order to maintain electrophotography image quality for a long period of time.

Moreover, since the electrophotographic photoreceptor is typically manufactured by dissolving a functional material and a binder resin in an organic solvent and film-casting the obtained solvent on a conductive substrate and the like, the electrophotographic photoreceptor is required to have solubility in the organic solvent and stability of the obtained solvent.

Traditionally, a polycarbonate resin using, for instance, 2,2-bis(4-hydroxyphenyl)propane (bisphenol A) and 1,1-bis(4-hydroxyphenyl)cyclohexane (bisphenol Z) as an ingredient have been used as a binder resin for an electrophotographic photoreceptor. However, such a polycarbonate resin is insufficient to satisfy durability such as wear resistance. In view of the above, various techniques have been used in response to such demands. A copolymerized polycarbonate has been known as one of effective techniques (see, for instance, Patent Literatures 1 to 3).

A resin disclosed in Patent Literature 1 includes a polycarbonate copolymer manufactured by copolymerizing a component having a biphenol skeleton that contributes to wear resistance with a component having a bisphenol Z skeleton that contributes to solubility. This polycarbonate copolymer is proved to have a wear resistance superior to that of a bisphenol-Z polycarbonate homopolymer.

Patent Literature 2 discloses an alternating copolymer of bisphenol A and biphenol as a polymer in which a copolymerization ratio of biphenol is increased using a raw material in which the number of monomer units in an oligomer is reduced. The copolymerization ratio of biphenol contained in the alternating copolymer is 50 mol %. Patent Literature 3 discloses a polycarbonate copolymer having 60 mol % of a copolymerization ratio of biphenol in the polycarbonate copolymer.

Patent Literature 4 discloses technique for manufacturing a bischloroformate compound by reacting, for instance, bisphenol A and bisphenol Z with phosgene.

CITATION LIST

Patent Literatures

Patent Literature 1: JP-A-4-179961
Patent Literature 2: JP-A-5-70582
Patent Document 3: International Publication No. WO2010-150885
Patent Literature 4: JP-A-8-27068

SUMMARY OF THE INVENTION

Problems to be Solved by the Invention

In the aforementioned polycarbonate copolymer disclosed in Patent Literature 1, a content of a biphenol component, which contributes to improvement in wear resistance, is approximately 23 mol % at most. This is because oligomers (ingredient) having a chloroformate group at a molecule end are specifically a dimer, a trimer and a tetramer. In order to increase the content of the biphenol component, an attempt has been made to manufacture an oligomer of biphenol by the method described in Patent Literature 1. However, an undissolved component is deposited to cause failure in synthesis of the oligomer. Moreover, when a bisphenol Z monomer and biphenol are mixed to manufacture a polycarbonate copolymer, a solution in which the obtained polycarbonate copolymer is dissolved is unfavorably whitened.

Since the polymer carbonate resin disclosed in Patent Literature 2 is not terminated, the polymer has a highly polar and highly reactive group (e.g. an OH group and a chloroformate group) at ends. For this reason, when the polycarbonate resin is used as, for instance, a binder resin of the electrophotographic photoreceptor, the polycarbonate resin unfavorably degrades a functional material to be mixed together or deteriorates electrical characteristics.

In the polycarbonate copolymer disclosed in Patent Literature 3, when the copolymer has 47 mol % or more of the molar copolymer composition as defined in the invention, a reduced viscosity is decreased. Moreover, in such a composition, it is found that a ratio of a hydroxyl group at all chain ends of the polycarbonate is more than 20 mol %.

On the other hand, Patent Literature 4 only discloses that a bischloroformate compound is usable as an ingredient for a polycarbonate, but fails to disclose a structure of the polycarbonate resin.

An object of the invention is to provide: a polycarbonate copolymer exhibing excellent solubility in an organic solvent, electrical characteristics and wear resistance; a coating liquid using the polycarbonate copolymer; an electrophotographic photoreceptor; and a manufacturing method of the polycarbonate copolymer.

Means for Solving the Problems

In order to solve the above problems, the invention provides a polycarbonate copolymer, a coating liquid using the same, an electrophotographic photoreceptor, and a polycarbonate copolymer as described below.

[1] According to an aspect of the invention, a polycarbonate copolymer includes a structure formed of a repeating unit represented by the following formula (100), in which a molar copolymer composition represented by $Ar^1/(Ar^1+Ar^2)$ is in a range of 50 mol % to 67 mol %, a reduced viscosity [ηsp/C] of the polycarbonate copolymer is in a range of 0.60 dl/g to 4.0 dl/g, and a ratio of a hydroxyl group at all ends is 20 mol % or less.

[Formula 1]

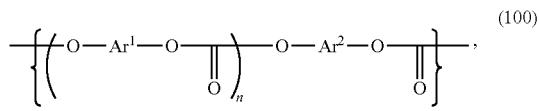

(100)

In the formula (100), $Ar^2$ represents a divalent group having an aromatic group. $Ar^1$ represents a group represented by the following formula (2). Chain ends are terminated by a monovalent aromatic group or a monovalent fluorine-containing aliphatic group. n represents an average repeating number of an $Ar^1$ block and is a numeral of 1.0 to 1.99. $Ar^1$ and $Ar^2$ are not the same.

[Formula 2]

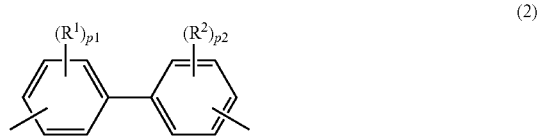

(2)

In the formula, $R^1$ and $R^2$ represent a halogen atom, a trifluoromethyl group, an alkyl group having 1 to 12 carbon atoms, a substituted or unsubstituted aryl group having 6 to 12 ring carbon atoms, an alkoxy group having 1 to 12 carbon atoms, a substituted or unsubstituted aryloxy group having 6 to 12 ring carbon atoms, or a substituted or unsubstituted arylalkyl group having 7 to 20 carbon atoms.

$p_1$ and $p_2$ each represent an integer of 0 to 4. When the aromatic ring is substituted by two or more of $R^1$ or $R^2$ ($p_1$, $p_2 \geq 2$), the two or more of $R^1$ or $R^2$ are optionally different groups.

[2] According to another aspect of the invention, a polycarbonate copolymer includes a structure formed of a repeating unit represented by the following formula (1), in which a molar copolymer composition represented by Ar1/(Ar1+Ar2+Ar3) is in a range of 47 mol % to 67 mol %, a reduced viscosity [ηsp/C] of the polycarbonate copolymer is in a range of 0.60 dl/g to 4.0 dl/g, and a ratio of a hydroxyl group at all ends is 20 mol % or less.

[Formula 3]

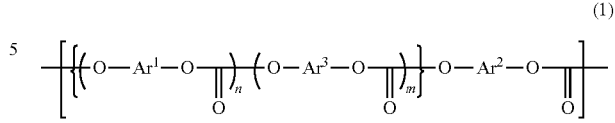

(1)

In the formula, Ar2 and Ar3 each represent a divalent group having an aromatic group. $Ar^1$ represents a group represented by the following formula (2). Chain ends are terminated by a monovalent aromatic group or a monovalent fluorine-containing aliphatic group. n represents an average repeating number of an $Ar^1$ block and is a numeral of 1.0 to 1.99. m represents an average repeating number of an $Ar^3$ block and is a numeral of 1.0 to 4.0. $Ar^2$ and $Ar^3$ are optionally the same or different, but $Ar^1$ is not the same as $Ar^2$ and $Ar^3$,

[Formula 4]

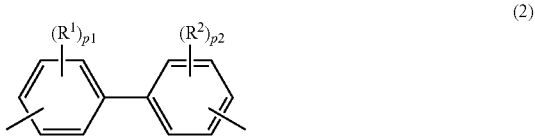

(2)

In the formula, $R^1$ and $R^2$ represent a halogen atom, a trifluoromethyl group, an alkyl group having 1 to 12 carbon atoms, a substituted or unsubstituted aryl group having 6 to 12 ring carbon atoms, an alkoxy group having 1 to 12 carbon atoms, a substituted or unsubstituted aryloxy group having 6 to 12 ring carbon atoms, or a substituted or unsubstituted arylalkyl group having 7 to 20 carbon atoms. $p_1$ and $p_2$ each are an integer of 0 to 4. When the aromatic ring is substituted by two or more of $R^1$ or $R^2$ ($p_1$, $p_2 \geq 2$), $R^1$ and $R^2$ are optionally different.

[3] In the polycarbonate copolymer according to the above aspect of the invention, $Ar^2$ is a group represented by at least one of the following formulae (3) and (4).

[Formula 5]

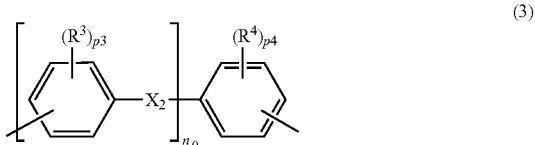

(3)

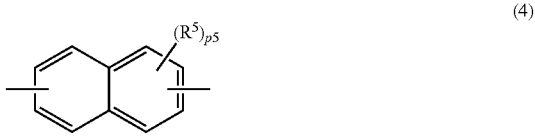

(4)

In the formula, $X_2$ represents —O—, —CO—, —S—, —SO—, —SO$_2$—, —CONH—, —CR$^6$R$^7$— in which R$^6$ and R$^7$ each independently represent a hydrogen atom, an alkyl group having 1 to 12 carbon atoms, a trifluoromethyl group or a substituted or unsubstituted aryl group having 6 to 12 ring carbon atoms, —O—R$^8$—O— in which R$^8$ is a carbonyl group, an alkyl chain having 1 to 6 carbon atoms, or a trifluoroalkyl chain and may be branched, a substituted or unsubstituted cycloalkylidene group having 5 to 12 ring carbon atoms, a substituted or unsubstituted adamantane-2,2-diyl group, a substituted or unsubstituted adamantane-1,3-diyl group, a substituted or unsubstituted α,ω-alkylene group having 2 to 12 carbon atoms, a substituted or unsubstituted 9,9-fluorenylidene group, a 1,8-menthanediyl group, a 2,8-menthanediyl group, a substituted or unsubstituted pyrazylidene group, or a substituted or unsubstituted arylene group having 6 to 12 ring carbon atoms.

$R^3$, $R^4$ and $R^5$ each represent a halogen atom, a trifluoromethyl group, an alkyl group having 1 to 12 carbon atoms, a substituted or unsubstituted aryl group having 6 to 12 ring carbon atoms, an alkoxy group having 1 to 12 carbon atoms, a substituted or unsubstituted aryloxy group having 6 to 12 ring carbon atoms, or a substituted or unsubstituted arylalkyl group having 7 to 20 carbon atoms;

$p_3$ and $p_4$ represents an integer of 0 to 4 and $p_5$ represents an integer of 0 to 6.

a repeating unit number $n_0$ is in a range of 0 to 2, in which $R^3$, $p_3$ and $X_2$ are selected in each of the repeating unit.

when an aromatic ring is substituted by two or more of $R^3$ or $R^4$ ($p_3$, $p_4 \geq 2$), $R^3$ and $R^4$ each are optionally different groups; and When an aromatic ring is substituted by two or more of $R^5$ ($p_5 \geq 2$), the two or more of $R^5$ may be different groups.

[4] In the polycarbonate copolymer according to the above aspect of the invention, $Ar^2$ is a group represented by the following formula (3'),

[Formula 6]

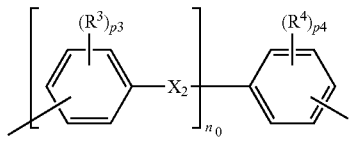

(3')

In the formula, $X_2$ represents —O—, —$CR^6R^7$— in which $R^6$ and $R^7$ each independently represent a hydrogen atom, an alkyl group having 1 to 12 carbon atoms, a trifluoromethyl group or a substituted or unsubstituted aryl group having 6 to 12 ring carbon atoms, a substituted or unsubstituted cycloalkylidene group having 5 to 12 ring carbon atoms, a substituted or unsubstituted adamantane-2,2-diyl group, a substituted or unsubstituted adamantane-1,3-diyl group, or a substituted or unsubstituted α,ω-alkylene group having 2 to 12 carbon atoms. $n_0$ is 1; and $R^3$, $R^4$, $p_3$ and $p_4$ are the same as those in the formula (3).

[5] In the polycarbonate copolymer according to the above aspect of the invention, $Ar^2$ and $Ar^3$ each are a group represented by at least one of the following formulae (3) and (4).

[Formula 7]

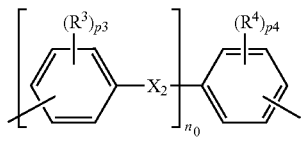

(3)

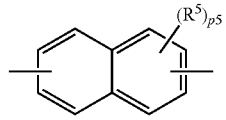

(4)

In the formula, $X_2$ represents —O—, —CO—, —S—, —SO—, —$SO_2$—, —CONH—, —$CR^6R^7$— in which $R^6$ and $R^7$ each independently represent a hydrogen atom, an alkyl group having 1 to 12 carbon atoms, a trifluoromethyl group or a substituted or unsubstituted aryl group having 6 to 12 ring carbon atoms, —O—$R^8$—O— in which $R^8$ is a carbonyl group, an alkyl chain having 1 to 6 carbon atoms, or a trifluoroalkyl chain and may be branched, a substituted or unsubstituted cycloalkylidene group having 5 to 12 ring carbon atoms, a substituted or unsubstituted adamantane-2,2-diyl group, a substituted or unsubstituted adamantane-1,3-diyl group, a substituted or unsubstituted α,ω-alkylene group having 2 to 12 carbon atoms, a substituted or unsubstituted 9,9-fluorenylidene group, a 1,8-menthanediyl group, a 2,8-menthanediyl group, a substituted or unsubstituted pyrazylidene group, or a substituted or unsubstituted arylene group having 6 to 12 ring carbon atoms.

$R^3$, $R^4$ and $R^5$ each represent a halogen atom, a trifluoromethyl group, an alkyl group having 1 to 12 carbon atoms, a substituted or unsubstituted aryl group having 6 to 12 ring carbon atoms, an alkoxy group having 1 to 12 carbon atoms, a substituted or unsubstituted aryloxy group having 6 to 12 ring carbon atoms, or a substituted or unsubstituted arylalkyl group having 7 to 20 carbon atoms.

$p_3$ and $p_4$ represents an integer of 0 to 4 and $p_5$ represents an integer of 0 to 6.

a repeating unit number $n_0$ is in a range of 0 to 2, in which $R^3$, $p_3$ and $X_2$ are selected in each of the repeating unit.

When an aromatic ring is substituted by two or more of $R^3$ or $R^4$ ($p_3$, $p_4 \geq 2$), $R^3$ and $R^4$ each are optionally different groups.

When an aromatic ring is substituted by two or more of $R^5$ ($p_5 \geq 2$), the two or more of $R^5$ may be different groups.

[6] In the polycarbonate copolymer according to the above aspect of the invention, $Ar^2$ and $Ar^3$ are a group represented by the following formula (3').

[Formula 8]

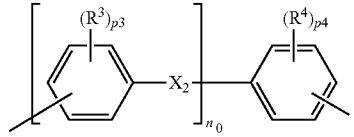

(3')

In the formula, $X_2$ represents —O—, —$CR^6R^7$— in which $R^6$ and $R^7$ each independently represent a hydrogen atom, an alkyl group having 1 to 12 carbon atoms, a trifluoromethyl group or a substituted or unsubstituted aryl group having 6 to 12 ring carbon atoms, a substituted or unsubstituted cycloalkylidene group having 5 to 12 ring carbon atoms, a substituted or unsubstituted adamantane-2,2-diyl group, a substituted or unsubstituted adamantane-1,3-diyl group, or a substituted or unsubstituted α,ω-alkylene group having 2 to 12 carbon atoms.

$n_0$ is 1; and $R^3$, $R^4$, $p_3$ and $p_4$ are the same as those in the formula (3).

[7] In the polycarbonate copolymer according to the above aspect of the invention, Ar² and Ar³ are the same group.

[8] The polycarbonate copolymer according to the above aspect of the invention further includes a divalent organic siloxane modified phenylene group for Ar².

[9] In the polycarbonate copolymer according to the above aspect of the invention, the divalent organic siloxane modified phenylene group is a group represented by the following formula (3A) or (3B).

[Formula 9]

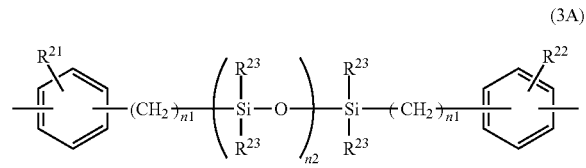

(3A)

In the formula (3A), R²¹ and R²² each independently represent a hydrogen atom, a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 ring carbon atoms.

R²³ each independently represents a substituted or unsubstituted alkyl group having 1 to 12 carbon atoms or a substituted or unsubstituted aryl group having 6 to 12 ring carbon atoms. n1 is an integer in a range of 2 to 4; and n2 is an integer in a range of 1 to 600.

n1 to n4 each represent an integer of 0 or more, with the proviso that a sum of n1, n2, n3 and n4 is an integer of 2 to 600, and a sum of n3 and n4 is an integer of 1 or more.

a is an integer of 0 to 4.

[10] In the polycarbonate copolymer according to the above aspect of the invention, Ar¹ represented by the formula (2) is a divalent group derived from a group selected from 4,4'-biphenol and 3,3'-dimethyl-4,4'-biphenol.

[11] According to still another aspect of the invention, a manufacturing method of a polycarbonate copolymer includes reacting a bischloroformate oligomer represented by the following formula (5) or a combination of the following formulae (5) and (6) with a divalent phenol monomer represented by the following formula (7) in the presence of an acid binding agent, in which, when a mole number of the bischloroformate oligomer is represented by Mc (mol), a mole number of the divalent phenol monomer is represented by Mp (mol), a mole number of the acid binding agent is represented by Mo (mol), and a valence of the acid binding agent is represented by Y, a value X of the acid binding agent represented by the following formula (Numerical Formula 1) is in a range of 1.1 to 1.3.

(Numerical Formula 1)

$$X = Mo \cdot Y/(2Mc - 2Mp)$$

[Formula 11]

[Formula 10]

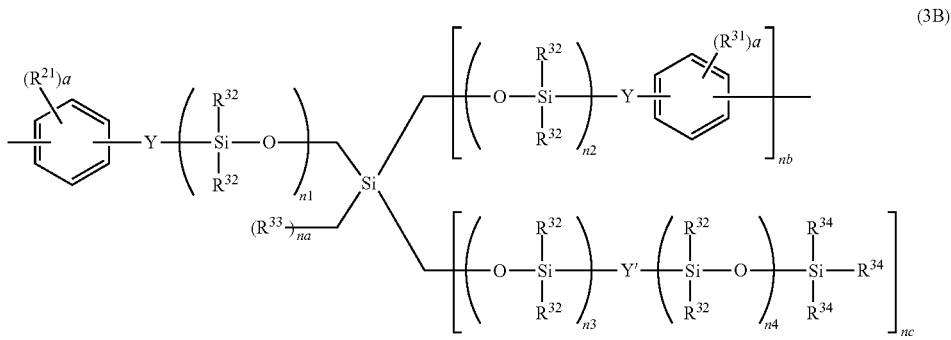

(3B)

In the formula (3B), R³¹ each independently represents a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 ring carbon atoms.

R³² each independently a substituted or unsubstituted alkyl group having 1 to 12 carbon atoms, or a substituted or unsubstituted aryl group having 6 to 12 ring carbon atoms.

R³³ represents a monovalent hydrocarbon group having no aliphatic unsaturated bond, the monovalent hydrocarbon being the same or different.

R³⁴ represents a monovalent hydrocarbon group having no aliphatic unsaturated bond, the monovalent hydrocarbon being the same or different.

Y and Y' are an alkylene group having 2 or more carbon atoms, alkyleneoxyalkylene group or an oxygen atom.

na is 0 or 1, nb is 1 or 2, and nc is 1 or 2, with the proviso that na+nb+nc=3.

-continued

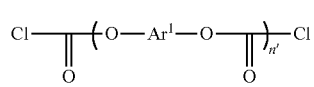

(5)

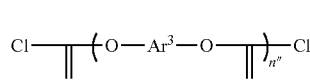

(6)

$$HO—Ar^2—OH$$ (7)

In the formula, Ar¹ is a group represented by the formula (2). Ar² and Ar³ are a group having a divalent aromatic group. Ar² and Ar³ may be the same or different, but Ar¹ is not the same as Ar² and Ar³. n' is a numeral of 1.0 to 1.99. n" is 0 or a numeral of 1.0 to 4.0.

[Formula 12]

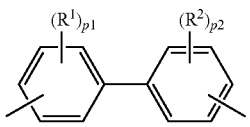

(2)

In the formula, $R^1$ and $R^2$ each represent a halogen atom, a trifluoromethyl group, an alkyl group having 1 to 12 carbon atoms, a substituted or unsubstituted aryl group having 6 to 12 ring carbon atoms, an alkoxy group having 1 to 12 carbon atoms, a substituted or unsubstituted aryloxy group having 6 to 12 ring carbon atoms, or a substituted or unsubstituted arylalkyl group having 7 to 20 carbon atoms.

$p_1$ and $p_2$ each are an integer of 0 to 4. When the aromatic ring is substituted by two or more of $R^1$ or $R^2$ ($p_1$, $p_2 \geq 2$), $R^1$ and $R^2$ are optionally different.

[12] A coating liquid according to a further aspect of the invention includes: the polycarbonate copolymer according to the above aspect of the invention; and an organic solvent.

[13] A coating liquid according to a still further aspect of the invention includes: the polycarbonate copolymer manufactured by the manufacturing method according to the above aspect of the invention; and an organic solvent.

[14] An electrophotographic photoreceptor according to a still further aspect of the invention includes a conductive substrate and a photosensitive layer on the conductive substrate, the photosensitive layer including the polycarbonate copolymer according to the above aspect of the invention as a component.

[15] An electrophotographic photoreceptor according to a still further aspect of the invention includes a conductive substrate and a photosensitive layer on the conductive substrate, the photosensitive layer including the polycarbonate copolymer manufactured by the manufacturing method according to the above aspect of the invention as a component.

According to the above aspect of the invention, the polycarbonate copolymer includes, as a repeating unit, a unit derived from an oligomer having a small number of monomer units of a divalent aromatic compound and a unit derived from a monomer having a skeleton different from that of the above divalent aromatic compound, and has a molar copolymer composition represented by $Ar^1/(Ar^1+Ar^2)$ in a range of 50 mol % to 67 mol %. With this arrangement, the polycarobonate polymer has different characteristics of both $Ar^1$ and $Ar^2$. Moreover, with an average repeating number of an $Ar^1$ block in a range of 1.0 to 1.99, the polycarobonate polymer can prevent disadvantages (e.g. decrease in solubility in accordance with increase in crystallinity) particularly caused by the presence of the repeating units of a plurality of $Ar^1$.

For instance, the polycarbonate copolymer, which includes, as a repeating unit, a unit derived from an oligomer having a small number of monomer units of a divalent aromatic compound having a skeleton contributing to wear resistance and a unit derived from a monomer having a skeleton contributing to a high solubility, keeps a high solubility and stability to an organic solvent. Accordingly, a coating liquid using the polycarbonate copolymer is not whitened but is transparent. When the polycarbonate copolymer is used as a binder resin of a photosensitive layer of an electrophotographic photoreceptor, the electrophotographic photoreceptor is excellent in wear resistance.

Moreover, according to the above aspect of the invention, the polycarbonate copolymer includes, as a repeating unit, a unit derived from an oligomer having a small number of monomer units of a divalent aromatic compound, a unit derived from an oligomer having a small number of monomer units of a divalent aromatic compound having a skeleton different from that of the above divalent aromatic compound, and a unit derived from a monomer of the oligomer, and has a molar copolymer composition represented by $Ar^1/(Ar^1+Ar^2+Ar^3)$ in a range of 47 mol % to 67 mol %. With this arrangement, the polycarobonate polymer has different characteristics of $Ar^1$, $Ar^2$ and $Ar^3$. Moreover, with an average repeating number of an $Ar^1$ block in a range of 1.0 to 1.99, the polycarobonate polymer can prevent disadvantages (e.g. decrease in solubility in accordance with increase in crystallinity) particularly caused by the presence of the repeating units of a plurality of $Ar^1$.

For instance, the polycarbonate copolymer, which includes, as a repeating unit, a unit derived from an oligomer having a small number of monomer units of a divalent aromatic compound having a skeleton contributing to wear resistance, a unit derived from an oligomer having a small number of monomer units of a divalent aromatic compound having a skeleton different from that of the above divalent aromatic compound, and a unit derived from the monomers, keeps a high solubility and stability to an organic solvent. Accordingly, a coating liquid using the polycarbonate copolymer is not whitened but is transparent. When the polycarbonate copolymer is used as a binder resin of a photosensitive layer of an electrophotographic photoreceptor, the electrophotographic photoreceptor is excellent in wear resistance.

Further, the polycarbonate copolymer according to the above aspect of the invention is terminated at chain ends. A ratio of a hydroxyl group at all the chain ends is 20 mo % or less. With this arrangement, when the polycarbonate copolymer is used as, for instance, a binder resin for an electrophotographic photoreceptor, the electrophotographic photoreceptor exhibits excellent electrical characteristics.

According to the manufacturing method of the polycarbonate copolymer in the above aspect of the invention, the polycarbonate copolymer having 20 mol % or less of the ratio of the hydroxyl group at all the chain ends can be stably manufactured.

DESCRIPTION OF EMBODIMENT(S)

A polycarbonate copolymer (hereinafter, simply referred to as a "PC copolymer") according to exemplary embodiments of the invention, a coating liquid using the PC copolymer, and an electrophotographic photoreceptor using the coating liquid will be described in detail below.

Structure of PC Copolymer

A PC copolymer according to this exemplary embodiment is configured to have a repeating unit represented by the following formula (100), in which a molar copolymer composition represented by $Ar^1/(Ar^1+Ar^2)$ is in a range of 50 mol % to 67 mol %, a reduced viscosity [ηsp/C] of the PC copolymer is in a range of 0.60 dl/g to 4.0 dl/g, and a ratio of a hydroxyl group at all ends is 20 mol % or less.

[Formula 13]

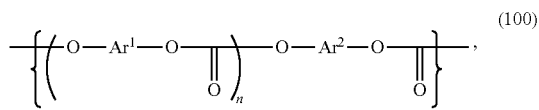

(100)

In the formula (100), $Ar^2$ represents a divalent group having an aromatic group.

$Ar^1$ is a group represented by the following formula (2).

Chain ends are terminated by a monovalent aromatic group or a monovalent fluorine-containing aliphatic group.

n represents an average repeating number of an $Ar^1$ block and is a numeral of 1.0 to 1.99.

$Ar^1$ and $Ar^2$ are not the same.

[Formula 14]

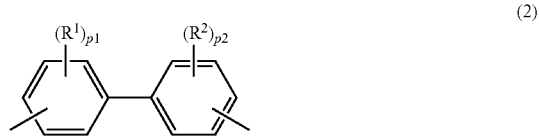

(2)

In the formula, $R^1$ and $R^2$ each represent a halogen atom, a trifluoromethyl group, an alkyl group having 1 to 12 carbon atoms, a substituted or unsubstituted aryl group having 6 to 12 ring carbon atoms, an alkoxy group having 1 to 12 carbon atoms, a substituted or unsubstituted aryloxy group having 6 to 12 ring carbon atoms, or a substituted or unsubstituted arylalkyl group having 7 to 20 carbon atoms.

$p_1$ and $p_2$ each are an integer of 0 to 4. When the aromatic ring is substituted by two or more of $R^1$ or $R^2$ ($p_1$, $p_2 \geq 2$), the two or more of $R^1$ or $R^2$ may be different groups.

Moreover, the PC copolymer according to this exemplary embodiment is configured to have a repeating unit represented by the following formula (1), in which a molar copolymer composition represented by $Ar^1/(Ar^1+Ar^2+Ar^3)$ is in a range of 47 mol % to 67 mol %, a reduced viscosity [$\eta sp/C$] of the PC copolymer is in a range of 0.60 dl/g to 4.0 dl/g, and a ratio of a hydroxyl group at all the ends is 20 mol % or less.

[Formula 15]

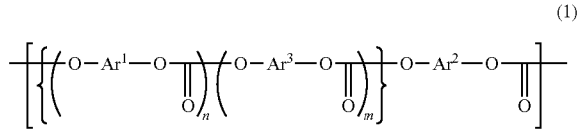

(1)

In the formula (1), $Ar^2$ and $Ar^3$ each represent a divalent group having an aromatic group. $Ar^1$ is a group represented by the following formula (2). Chain ends are terminated by a monovalent aromatic group or a monovalent fluorine-containing aliphatic group. n represents an average repeating number of an $Ar^1$ block and is a numeral of 1.0 to 1.99. m represents an average repeating number of an $Ar^3$ block and is a numeral of 1.0 to 4.0. $Ar^2$ and $Ar^3$ may be the same or different. However, $Ar^1$ is not the same as $Ar^2$ and $Ar^3$.

[Formula 16]

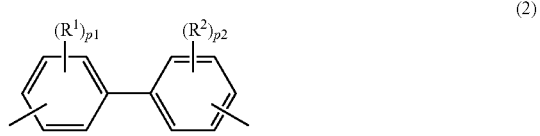

(2)

In the formula, $R^1$ and $R^2$ each represent a halogen atom, a trifluoromethyl group, an alkyl group having 1 to 12 carbon atoms, a substituted or unsubstituted aryl group having 6 to 12 ring carbon atoms, an alkoxy group having 1 to 12 carbon atoms, a substituted or unsubstituted aryloxy group having 6 to 12 ring carbon atoms, or a substituted or unsubstituted arylalkyl group having 7 to 20 carbon atoms. $p_1$ and $p_2$ each are an integer of 0 to 4. When the aromatic ring is substituted by two or more of $R^1$ or $R^2$ ($p_1$, $p_2 \geq 2$), two or more of $R^1$ or $R^2$ may be different substituents.

Examples of a halogen atom forming $R^1$ and $R^2$ are a fluorine atom, a chlorine atom and a bromine atom.

Examples of the alkyl group having 1 to 12 carbon atoms which forms $R^1$ and $R^2$ are a linear or branched alkyl group. Examples of the linear or branched alkyl group are a methyl group, an ethyl group, propyl groups, butyl groups, pentyl groups and hexyl groups. Also, the alkyl group may be a cyclic alkyl group such as a cyclohexyl group. Further, a part or an entirety of the hydrogen atom in the alkyl group may be substituted by a halogen atom. Examples of other substituents are a trifluoromethyl group, an aryl group having 6 to 12 ring carbon atoms, an alkoxy group having 1 to 12 carbon atoms and an aryloxy group having 6 to 12 ring carbon atoms. Examples of the alkyl group forming the substituents are the same groups as the above. Examples of the aryl group forming the substituents are the following groups.

The substituted or unsubstituted aryl group having 6 to 12 ring carbon atoms which forms $R^1$ and $R^2$ is exemplified by a phenyl group.

The above groups are examples for the aryl group and the alkyl group which form the alkoxy group having 1 to 12 carbon atoms, the substituted or unsubstituted aryloxy group having 6 to 12 ring carbon atoms, and the substituted or unsubstituted arylalkyl having 7 to 20 carbon atoms, which form $R^1$ and $R^2$.

When the aryl group, the aryloxy group or the arylalkyl group has a substituent in $R^1$ and $R^2$, for instance, the substituent may be an alkyl group having 1 to 6 carbon atoms. Examples of other substituents are a halogen atom and a trifluoromethyl group.

$p_1$ and $p_2$ each are an integer of 0 to 4, preferably 0 or 1.

The phrase that "chain ends are terminated by a monovalent aromatic group or a monovalent fluorine-containing aliphatic group" does not mean that all the chain ends of the polycarbonate copolymer in the exemplary embodiment are terminated by a monovalent aromatic group or a monovalent fluorine-containing aliphatic group. In the PC copolymer of the exemplary embodiment, since it is important to set a reduced viscosity representing a molecular weight within a predetermined range, an amount of a terminal terminator to be used is restricted. For this reason, it is difficult to eliminate all the OH groups at the ends as shown in Examples of the invention.

The PC copolymer is typically manufactured by forming an $Ar^1$ block and then reacting the $Ar^1$ block with a monomer having $Ar^2$ and $Ar^3$ blocks and a monovalent aromatic group or a monovalent fluorine-containing aliphatic group. Accordingly, an average repeating number n does not become a numeral of 1.0 or less. On the other hand, when the average repeating number n exceeds 1.99, the $Ar^1$ block becomes long to be crystallized and whitened in a solution, so that the PC copolymer becomes undissolved, which is a crucial disadvantage in use. Accordingly, n needs to be favorably in a range of 1.0 to 1.99. This is because the structure represented by the formula (2) is easily crystallized. On the other hand, although the details will be described later, since the $Ar^3$ block is unlikely to be crystallized, m only needs to be adjusted to 0 or in a range of 1.0 to 4.0.

Herein, the formula (100) represents a case where no $Ar^3$ block is used in the formula (1). When the $Ar^3$ block is used, the average repeating number m of the $Ar^3$ block is not a numeral of 1.0 or less. On the other hand, when $Ar^3$ has a skeleton having a relatively high crystallinity, m of more than 4.0 causes the $Ar^3$ block to be crystallized, resulting in deteriorating solubility and transparence of the solution. Accordingly, when the PC copolymer containing the $Ar^3$ block with m of more than 4.0 is used, for instance, as a coating liquid, disadvantages such as whitening possibly occur. When this PC copolymer is used as a binder resin for an electrophotographic photoreceptor, wear resistance is possibly decreased.

In the PC copolymer of the exemplary embodiment including the repeating unit described in the formula (100), $Ar^1/(Ar^1+Ar^2)$ (i.e., the content of $Ar^1$) is in a range of 50 mol % to 67 mol %, preferably of 50 mol % to 65 mol %.

In the PC copolymer of the exemplary embodiment including the repeating unit described in the formula (1), the content of $Ar^1$ represented by $Ar^1/(Ar^1+Ar^2+Ar^3)$ is in a range of 47 mol % to 67 mol %, preferably of 47 mol % to 65 mol %, more preferably of 47 mol % to 62 mol %. When the content of $Ar^1$ exceeds 67 mol %, crystallization of the copolymer proceeds to generate a phenomenon that the copolymer becomes undissolved in an organic solvent. Accordingly, the copolymer containing the content of $Ar^1$ of more than 67 mol % is not suitable as a binder resin for an electrophotographic photoreceptor. When the content of $Ar^1$ is less than 47 mol %, wear resistance of the PC copolymer is decreased. Accordingly, it becomes difficult to provide a copolymer having all the characteristics of $Ar^1$, $Ar^2$ and $Ar^3$.

In the PC copolymer of the exemplary embodiment including the repeating unit described in the formula (1), particularly when the content of $Ar^1$ is less than 50 mol %, the PC copolymer can keep a content ratio of a skeleton contributing to solubility at a predetermined level or more by containing the $Ar^3$ block, so that solubility of the PC copolymer can be reliably kept and stability of the solution can be enhanced.

When the PC copolymer is manufactured only using an oligomer having the $At^1$ skeleton and having 1.0 to 1.99 of the monomer units, the content of $Ar^1$ in the polymer can be 50 mol % or more, but cannot be 50 mol % or less. Simultaneous use of an oligomer having the $Ar^3$ skeleton enables to decrease a ratio of the $Ar^1$ skeleton in the oligomer having a chloroformate group, thereby achieving the content of $Ar^1$ of less than 50 mol %.

The aforementioned mol % is a value obtained when a molar copolymer composition represented by $Ar^1/(Ar^1+Ar^2+Ar^3)$ is represented by percentage.

n and m respectively representing the average repeating numbers of $Ar^1$ and $Ar^3$ can be easily calculated based on the respective molar copolymer compositions.

In the PC copolymer including the repeating unit described in the formula (100), n is automatically determined based on the molar composition ratio of $Ar^1$ in $Ar^1/(Ar^1+Ar^2)$.

In the PC copolymer of the exemplary embodiment including the repeating unit described in the formula (1), it is necessary to calculate molar ratios of $Ar^1$ and $Ar^3$ to determine the average repeating numbers n and m in view of $^{13}$C-NMR analysis results and the number of the monomer units of the oligomer.

In a solution where the PC copolymer of exemplary embodiment is dissolved in a solvent of methylene chloride at a concentration of 0.5 g/dl, the PC copolymer exhibits reduced viscosity $[\eta_{SP}/C]$ at 20 degrees C. in a range of 0.60 dl/g to 4.0 dl/g, more preferably in a range of 0.70 dl/g to 3.0 dl/g, particularly preferably of 0.90 dl/g to 2.0 dl/g. When the reduced viscosity $[\eta_{SP}/C]$ is less than 0.60 dl/g, wear resistance of the PC copolymer may be insufficient in use as the electrophotographic photoreceptor. When the reduced viscosity $[\eta_{SP}/C]$ is more than 4 dl/g, a coating viscosity of the PC copolymer may become too high for manufacturing a molded product (the electrophotographic photoreceptor and the like) from a coating liquid, so that productivity of the electrophotographic photoreceptor may be unfavorably lowered.

The PC copolymer of the exemplary embodiment has a ratio of a hydroxyl group in all the chain ends (all the ends) (hereinafter, also referred to as "OH terminal ratio") of 20 mol % or less, preferably 10 mol % or less, more preferably 8 mol % or less. When the OH terminal ratio exceeds 20 mol %, volume and sensitivity are unfavorably decreased in use as the binder resin for the electrophotographic photoreceptor. It should be noted that the lower limit of the OH terminal ratio is not particularly determined, but the smaller OH terminal ratio is preferable. The lower limit achievable by improving the manufacturing method of the PC copolymer is about 0.01 mol %.

In the formulae (100) and (1), $Ar^2$ and $Ar^3$ only need to be a divalent aromatic group different from $Ar^1$.

In the formula (1), $Ar^1$ and $Ar^2$ may be similar groups or different groups. However, when $Ar^1$ is different from $Ar^2$ and $Ar^3$ in the fundamental structure, the PC copolymer may preferably exhibit synergistic effects derived from the respective groups. On the other hand, when $Ar^2$ and $Ar^3$ are the same group in the fundamental structure, only two fundamental structures exist in the manufactured PC copolymer, thereby facilitating understanding and controlling of polymer characteristics.

When the PC copolymer including the repeating unit described in the formula (100) or (1) is used particularly as a binder resin for an electrophotographic photoreceptor, the PC copolymer needs to have both solubility and wear resistance. Accordingly, $Ar^2$ and $Ar^3$ are preferably structured to contribute to solubility.

In view of the above, $Ar^2$ and $Ar^3$ are preferably a divalent aromatic group represented by at least one of the following formulae (3) and (4). Particularly, in the formula (3), $n_0$ is preferably 1.

[Formula 17]

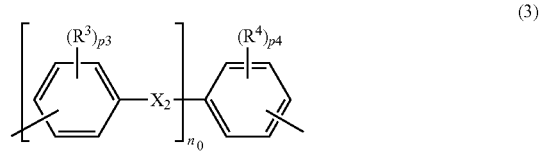

(3)

-continued

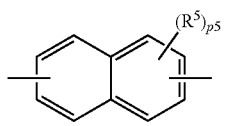
(4)

In the formula, $X_2$ represents —O—, —CO—, —S—, —SO—, —SO$_2$—, —CONH—, —CR$^6$R$^7$— in which R$^6$ and R$^7$ each independently represent a hydrogen atom, an alkyl group having 1 to 12 carbon atoms, a trifluoromethyl group or a substituted or unsubstituted aryl group having 6 to 12 ring carbon atoms, —O—R$^8$—O— in which R$^8$ is a carbonyl group, an alkyl chain having 1 to 6 carbon atoms, or a trifluoroalkyl chain and may be branched, a substituted or unsubstituted cycloalkylidene group having 5 to 12 ring carbon atoms, a substituted or unsubstituted adamantane-2,2-diyl group, a substituted or unsubstituted adamantane-1,3-diyl group, a substituted or unsubstituted α,ω-alkylene group having 2 to 12 carbon atoms, a substituted or unsubstituted 9,9-fluorenylidene group, a 1,8-menthanediyl group, a 2,8-menthanediyl group, a substituted or unsubstituted pyrazylidene, and a substituted or unsubstituted arylene group having 6 to 12 ring carbon atoms. R$^3$, R$^4$ and R$^5$ represent a halogen atom, a trifluoromethyl group, an alkyl group having 1 to 12 carbon atoms, a substituted or unsubstituted aryl group having 6 to 12 ring carbon atoms, an alkoxy group having 1 to 12 carbon atoms, a substituted or unsubstituted aryloxy group having 6 to 12 ring carbon atoms, or a substituted or unsubstituted arylalkyl group having 7 to 20 carbon atoms. $p_3$ and $p_4$ are an integer of 0 to 4. $p_5$ is an integer of 0 to 6. The repeating unit number $n_0$ is in a range of 0 to 2. R$^3$, $p_3$ and $X_2$ in the repeating unit can be selected at each unit. When the aromatic ring is substituted by two or more R$^3$ or R$^4$ ($p_3$, $p_4 \geq 2$), the two or more R$^3$ or R$^4$ may be different substituents. When the aromatic ring is substituted by two or more R$^5$ ($p_5 \geq 2$), the two or more R$^5$ may be different substituents.

Examples of the halogen atom, the alkyl group having 1 to 12 carbon atoms, the substituted or unsubstituted aryl group having 6 to 12 ring carbon atoms, the alkoxy group having 1 to 12 carbon atoms, the substituted or unsubstituted aryloxy group having 6 to 12 ring carbon atoms, the substituted or unsubstituted arylalkyl group having 7 to 20 carbon atoms, and the substituents for forming R$^3$, R$^4$ and R$^5$ in the formulae (3) and (4) are the same as the groups exemplified in the above description for R$^1$ and R$^2$. $p_3$ and $p_4$ each are an integer of 0 to 2. $p_5$ is preferably 0.

In the formula (3), R$^3$ and R$^4$ are preferably an alkyl group having 1 to 12 carbon atoms or a substituted or unsubstituted aryl group having 6 to 12 ring carbon atoms. These groups enable to provide more favorable wear resistance and electrical characteristics to the PC copolymer of the exemplary embodiment. Specifically, examples of the groups for R$^3$ and R$^4$ are the same as the groups exemplified in the above description for R$^1$ and R$^2$.

Specific examples of the alkyl group having 1 to 12 carbon atoms, the aryl group having 6 to 12 ring carbon atoms and the substituents for forming R$^6$ and R$^7$ in $X_2$ are the same as the groups exemplified in the above description for R$^1$ and R$^2$.

Specific examples of the alkyl group having 1 to 6 carbon atoms for forming R$^8$ in $X_2$ are a methylene group, an ethylene group and a propylene group. The trifluoroalkyl chain is a divalent group obtained by substituting all or a part of hydrogen atoms forming the alkyl chain with trifluoromethyl groups. An alkyl chain for forming the trifluoroalkyl chain is preferably an alkyl chain having 1 to 6 carbon atoms, specific examples of which are a methylene group, an ethylene group and a propylene group.

Examples of the substituted or unsubstituted cycloalkylidene group having 5 to 12 ring carbon atoms in $X_2$ are a cyclopentylidene group and a cyclohexylidene group. Examples of the substituted or unsubstituted α,ω-alkylene group having 2 to 12 carbon atoms are an ethylene group and a propylene group. The substituted or unsubstituted arylene group having 6 to 12 ring carbon atoms is exemplified by a phenyl group.

Examples of the substituents for the substituted or unsubstituted cycloalkylidene group having 5 to 12 ring carbon atoms, the substituted or unsubstituted adamantane-2,2-diyl group, the substituted or unsubstituted adamantane-1,3-diyl group, the substituted or unsubstituted α,ω-alkylene group having 2 to 12 carbon atoms, the substituted or unsubstituted 9,9-fluorenylidene group, the substituted or unsubstituted pyrazylidene, and the substituted or unsubstituted arylene group having 6 to 12 ring carbon atoms in $X_2$ includes: a halogen atom such as a fluorine atom, a chlorine atom and a bromine atom; an alkyl group having 1 to 12 carbon atoms such as a methyl group, an ethyl group, a t-butyl group and a cyclohexyl group; and an arylene group having 6 to 12 ring carbon atoms such as a phenyl group.

The pyrazylidene group is a group having bonds at two carbon atoms of four carbon atoms forming a pyrazine ring.

$X_2$ is preferably —O—, —CR$^6$R$^7$— in which R$^6$ and R$^7$ each independently represent a hydrogen atom, an alkyl group having 1 to 12 carbon atoms, a trifluoromethyl group or a substituted or unsubstituted aryl group having 6 to 12 ring carbon atoms, a substituted or unsubstituted cycloalkylidene group having 5 to 12 ring carbon atoms, a substituted or unsubstituted adamantane-2,2-diyl group, a substituted or unsubstituted adamantane-1,3-diyl group, a substituted or unsubstituted 9,9-fluorenylidene group, a 1,8-menthanediyl group, a 2,8-menthanediyl group, and a substituted or unsubstituted arylene group having 6 to 12 ring carbon atoms. These groups enable to provide more favorable wear resistance and electrical characteristics to the PC copolymer of the exemplary embodiment.

In view of enhancement in solubility, $X_2$ is preferably —CR$^6$R$^7$— in which R$^6$ and R$^7$ each independently represent a hydrogen atom, an alkyl group having 1 to 12 carbon atoms, a trifluoromethyl group or a substituted or unsubstituted aryl group having 6 to 12 ring carbon atoms, a substituted or unsubstituted cycloalkylidene group having 5 to 12 ring carbon atoms, a substituted or unsubstituted adamantane-2,2-diyl group, a substituted or unsubstituted adamantane-1,3-diyl group, and a substituted or unsubstituted α,ω-alkylene group having 2 to 12 carbon atoms.

On the other hand, in view of solubility and wear resistance, $X_2$ is preferably —O—.

Specific examples of the group represented by the formula (4) are a divalent group derived from 2,7-naphthalenediol, 2,6-naphthalenediol, 1,4-naphthalenediol, 1,5-naphthalenediol or 1,7-naphthalenediol.

The divalent group represented by the formula (4) is bondable to oxygen atoms of the formula (100) or (1) at any positions of 1 to 8-positions. Preferably, the divalent group is bonded thereto at 2,7-position, 2,6-position, 1,4-position or 1,5-position. R$^5$ is preferably an alkyl group having 1 to 6 carbon atoms. These groups enable to provide more favorable wear resistance and electrical characteristics to the PC copolymer of the exemplary embodiment.

Although the structures represented by the formulae (3) and (4) are unlikely to be crystallized, Ar$^3$ in the formula (1)

is preferably the group represented by the formula (3) to the group represented by the formula (4) since the $Ar^3$ block is more unlikely to be crystallized. Moreover, in the formulae (100) and (1), $Ar^2$ is also preferably the group represented by the formula (3). Further, $n_0$ is preferably 1 in the formula (3).

Moreover, it is preferable in terms of improvement in wear resistance that the examples of the divalent aromatic group as $Ar^2$ further include a divalent organic siloxane modified phenylene group.

$R^2$. A phenyl group and a methyl group are preferable among the examples.

n1 is an integer of 2 to 4. n2 is an integer of 1 to 600.

The divalent organic siloxane modified phenylene group may be a group represented by the following formula (3B). Although the groups represented by the formulae (3A) and (3B) improve wear resistant at the same level, an organic siloxane modified phenol compound (a material for a PC copolymer) containing the group represented by the formula (3A) is more easily available.

[Formula 19]

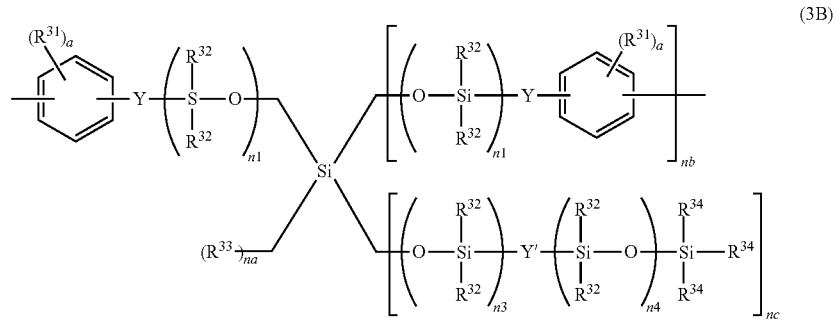

(3B)

The divalent organic siloxane modified phenylene group is exemplified by a group represented by the following formula (3A).

[Formula 18]

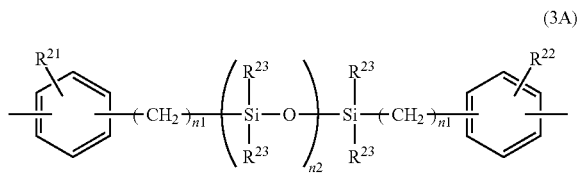

(3A)

In formula (3A), $R^{21}$ and $R^{22}$ each independently represent a hydrogen atom, a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 ring carbon atoms.

A chlorine atom is preferable as the halogen atom. Examples of the substituted or unsubstituted alkyl group having 1 to 12 carbon atoms, the substituted or unsubstituted alkoxy group having 1 to 12 carbon atoms and the substituted or unsubstituted aryl group having 6 to 12 ring carbon atoms are the same as the groups exemplified in the above description for $R^1$ and $R^2$.

$R^{21}$ and $R^{22}$ are preferably a hydrogen atom or an alkoxy group having 1 to 3 carbon atoms. More preferably, $R^{21}$ and $R^{22}$ have the following specific structure.

$R^{23}$ is a substituted or unsubstituted alkyl group having 1 to 12 carbon atoms or a substituted or unsubstituted aryl group having 6 to 12 ring carbon atoms.

Examples of the substituted or unsubstituted alkyl group having 1 to 12 carbon atoms and the substituted or unsubstituted aryl group having 6 to 12 ring carbon atoms are the same as the groups exemplified in the above description for $R^1$ and In the formula (3B), $R^{31}$ independently represents a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 ring carbon atoms.

A chlorine atom is preferable as the halogen atom. Examples of the substituted or unsubstituted alkyl group having 1 to 12 carbon atoms, the substituted or unsubstituted alkoxy group having 1 to 12 carbon atoms and the substituted or unsubstituted aryl group having 6 to 12 ring carbon atoms are the same as the groups exemplified in the above description for $R^1$ and $R^2$.

$R^{32}$ independently represents a substituted or unsubstituted alkyl group having 1 to 12 carbon atoms or a substituted or unsubstituted aryl group having 6 to 12 ring carbon atoms.

Examples of the substituted or unsubstituted alkyl group having 1 to 12 carbon atoms and the substituted or unsubstituted aryl group having 6 to 12 ring carbon atoms are the same as the groups exemplified in the above description for $R^1$ and $R^2$. A phenyl group and a methyl group are preferable among the examples.

$R^{33}$ represents a monovalent hydrocarbon group having no aliphatic unsaturated bond, the monovalent hydrocarbon being the same or different.

Examples of the monovalent hydrocarbon group are a substituted or unsubstituted alkyl group having 1 to 12 carbon atoms and a substituted or unsubstituted aryl group having 6 to 12 ring carbon atoms. Among these, the monovalent hydrocarbon group is preferably the alkyl group having 1 to 12 carbon atoms, particularly preferably, the methyl group.

$R^{34}$ represents a monovalent hydrocarbon group having no aliphatic unsaturated bond, the monovalent hydrocarbon being the same or different.

Examples of the monovalent hydrocarbon group are a substituted or unsubstituted alkyl group having 1 to 12 carbon atoms and a substituted or unsubstituted aryl group having 6 to 12 ring carbon atoms. Among these, the monovalent hydrocarbon group is preferably the alkyl group having 1 to 12 carbon atoms, particularly preferably, the methyl group.

Y and Y' are an alkylene group having 2 or more carbon atoms, alkyleneoxyalkylene group or an oxygen atom. Y and Y' are preferably an alkylene group having 2 to 10 carbon atoms, more preferably, a methylene group having 2 to 4 repeating units.

na is 0 or 1, nb is 1 or 2, and nc is 1 or 2, with the proviso that na+nb+nc=3.

n1 to n4 each are an integer of 0 or more, with the proviso that a sum of n1, n2, n3 and n4 is an integer of 2 to 600, and a sum of n3 and n4 is an integer of 1 or more.

a is an integer of 0 to 4. Preferably, a is 0 or 1.

In the electrophotographic photoreceptor by using the PC copolymer as a binder resin, surface energy is reduced by further including the divalent organic siloxane modified phenylene group as $Ar^2$, thereby reducing a possibility of extraneous substances adhering. Specifically, extraneous substances such as toner are prevented from adhering to the electrophotographic photoreceptor.

Specific examples of the divalent organic siloxane modified phenylene group are as follows.

[Formula 20]

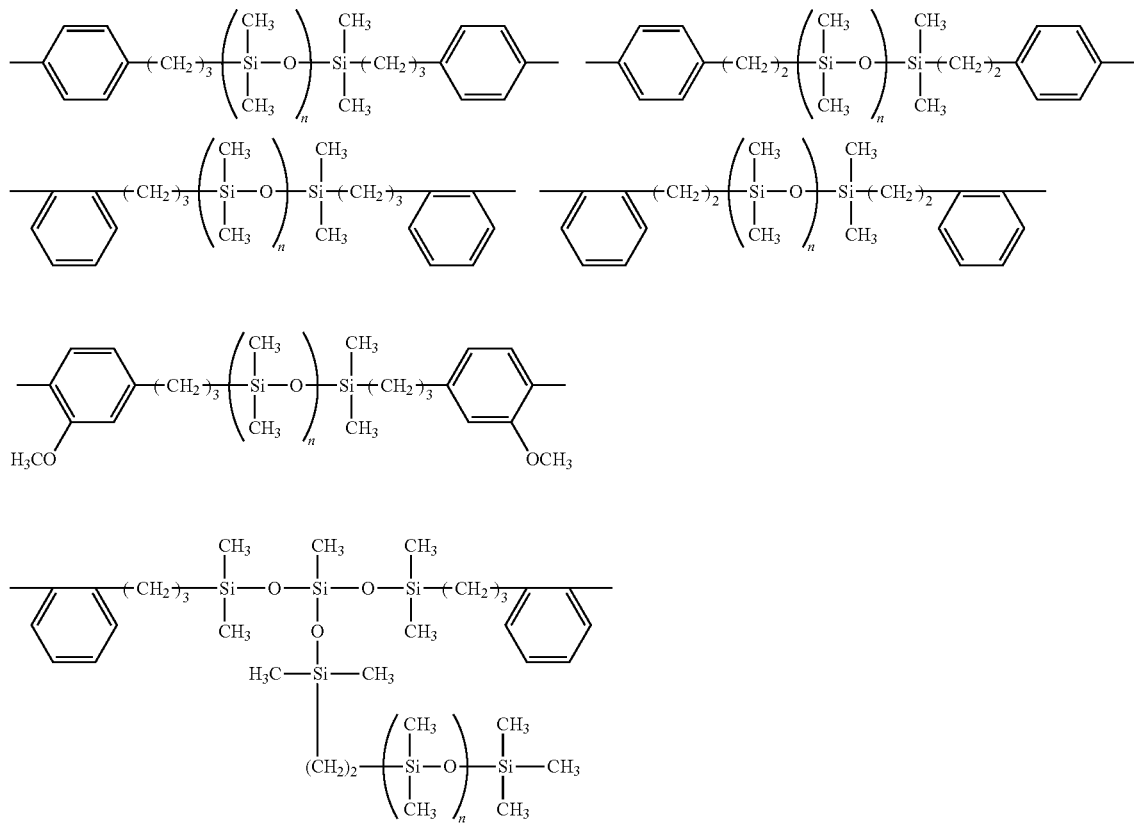

[Formula 21]

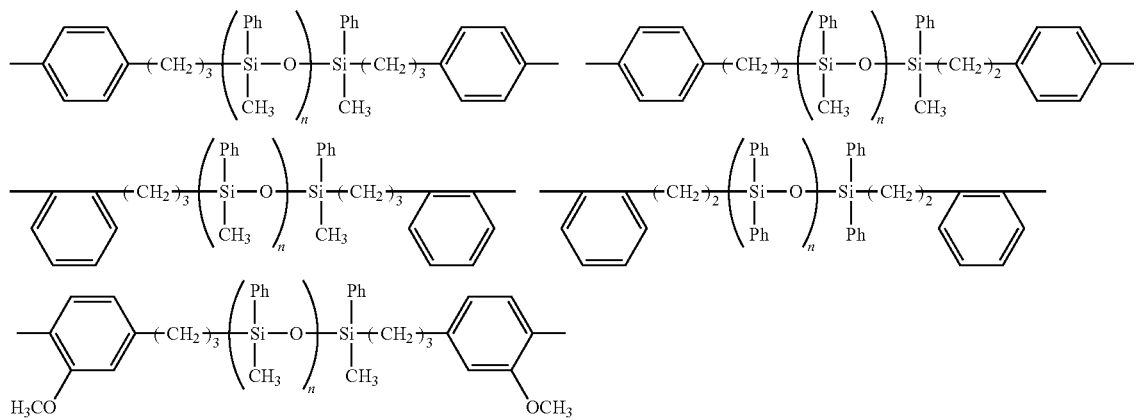

-continued

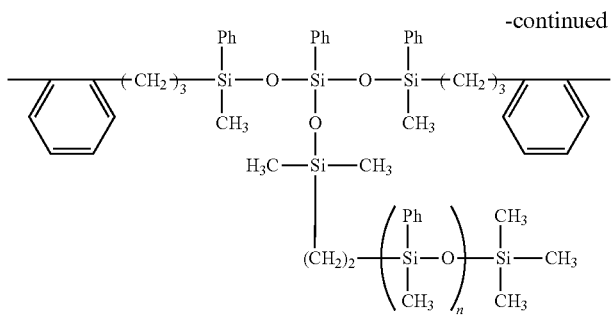

In the above formulae, the number (n) of the repeating units of an organic siloxylene group is preferably in a range of 1 to 600, more preferably of 10 to 300, particularly preferably of 20 to 200, most preferably of 30 to 150.

When n is 600 or less, compatibility with the PC copolymer becomes favorable to complete the reaction in polymerization step. Accordingly, an unreacted organic siloxane modified phenol compound is prevented from remaining in the final PC copolymer, whereby the resin is not whitened to restrain increase in residual potential of the electrophotographic photoreceptor in use as a binder resin.

On the other hand, when n is 1 or more, surface energy is sufficiently given to the electrophotographic photoreceptor, which favorably prevents adhesion of extraneous substances.

A ratio of the divalent organic siloxane modified phenylene group in the PC copolymer is in a range of 0.01 mass % to 50 mass %, preferably of 0.1 mass % to 20 mass %, more preferably of 0.5 mass % to 10 mass %, most preferably of 1 mass % to 6 mass %.

In the ratio of 0.1 mass % or more, adhesion of foreign substances can be more favorably prevented. With the ratio of 50 mass % or less, the PC copolymer exhibits excellent wear resistance and sufficient mechanical strength and is favorably used as the electrophotographic photoreceptor.

Chain ends are terminated by a monovalent aromatic group or a monovalent fluorine-containing aliphatic group. The monovalent aromatic group may be a group containing an aromatic group. The monovalent fluorine-containing aliphatic group may be a group containing an aromatic group. The phrase "chain ends are terminated by a monovalent aromatic group or a monovalent fluorine-containing aliphatic group" means that a monomer having one reaction group (e.g., a COOH group and an OH group) reacts with a polycarbonate chain to form a chain end as described later in relation to a terminal terminator.

The aromatic group at the chain end is preferably a substituted or unsubstituted aryl group having 6 to 12 ring carbon atoms. Examples of the aryl group are a phenyl group and a biphenyl group. The group containing the aromatic group is exemplified by a substituted or unsubstituted alkylaryl group having 7 to 20 carbon atoms. Examples of a substituent to be bonded to the aromatic group and the alkyl group bonded to the aromatic group are halogen atoms such as a fluorine atom, a chlorine atom and a bromine atom. The substituent bonded to the aromatic group is exemplified by an alkyl group having 1 to 20 carbon atoms. This alkyl group may be a group bonded by a halogen atom as described above and a group bonded by an aryl group.

The monovalent fluorine-containing aliphatic group at the chain end is exemplified by a fluorine-containing alkyl group having 1 to 20 carbon atoms.

When the monovalent aromatic group is at the chain end, the monovalent aromatic group may be an organic siloxane modified phenyl group.

The monovalent organic siloxane modified phenyl group is exemplified by a group represented by the following formula (3C).

[Formula 22]

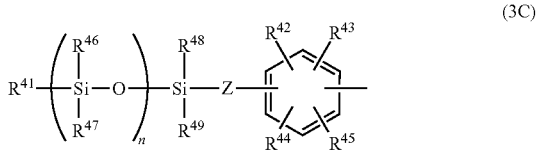

(3C)

In the formula, Z represents a hydrocarbon group having 2 to 6 carbon atoms. Z is preferably an alkylene group, more preferably, a methylene group having 2 to 4 repeating units.

$R^{41}$ represents an aliphatic hydrocarbon group having 1 to 6 carbon atoms. $R^{41}$ is preferably an alkyl group having 1 to 6 carbon atoms.

$R^{42}$ to $R^{45}$ independently represent hydrogen, a substituted or unsubstituted alkyl group having 1 to 12 carbon atoms, a substituted or unsubstituted alkoxy group having 1 to 12 carbon atoms and a substituted or unsubstituted aryl group having 6 to 12 ring carbon atoms.

$R^{46}$ to $R^{49}$ independently represent a substituted or unsubstituted alkyl group having 1 to 12 carbon atoms and a substituted or unsubstituted aryl group having 6 to 12 ring carbon atoms.

Examples of the substituted or unsubstituted alkyl group having 1 to 12 carbon atoms and the substituted or unsubstituted aryl group having 6 to 12 ring carbon atoms are the same as the groups exemplified in the above description for $R^1$ and $R^2$. A phenyl group and a methyl group are preferable among the examples.

n is an integer of 2 to 600 and represents an average number of repeating units in case of molecular weight distribution.

Examples of the monovalent organic siloxane modified phenyl group are as follows.

[Formula 23]

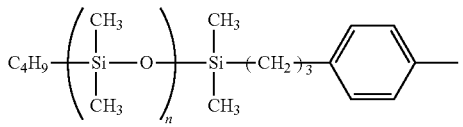

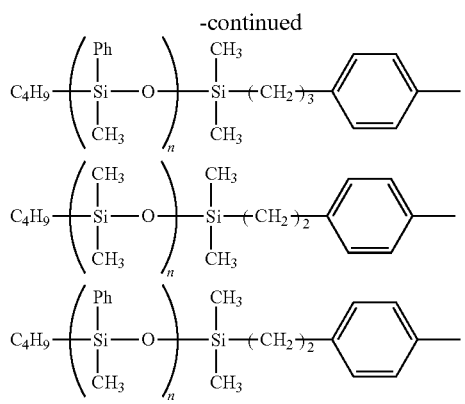

In the electrophotographic photoreceptor using the PC copolymer having the monovalent organic siloxane modified phenyl group as a binder resin, adhesion of extraneous substances such as toner can be reduced.

A ratio of the monovalent organic siloxane modified phenyl group, the ratio being required for expressing the above effects, is in a range of 0.01 mass % to 50 mass % relative to the entire PC copolymer. The ratio of the monovalent organic siloxane modified phenyl group is more preferably in a range of 0.1 mass % to 20 mass %, particularly preferably of 0.5 mass % to 10 mass %.

In the PC copolymer containing a unit derived from the divalent organic siloxane modified phenyl group in the main chain in addition to the monovalent organic siloxane modified phenyl group, this unit is added up together.

The PC copolymer according to this exemplary embodiment is obtainable by reacting a bischloroformate oligomer having a small number of monomer units represented by the following formula (5) or both the bischloroformate oligomer having a small number of the monomer units represented by the formula (5) and a bischloroformate oligomer represented by the following formula (6) with a divalent phenol compound (a comonomer) represented by the following formula (7) and a monovalent phenol compound (a terminal terminator) in the presence of a base calculated according to stoichiometry. Use of such an oligomer and the base content calculated according to stoichiometry in the reaction enables the average repeating number of the $Ar^1$ block to be in a range of 1.0 to 1.99 and the reduced viscosity [ηsp/C] to be in a range of 0.60 to 4.0 dl/g, thereby facilitating manufacturing the PC copolymer having a ratio of a hydroxyl group at all the ends of 20 mol % or less.

[Formula 24]

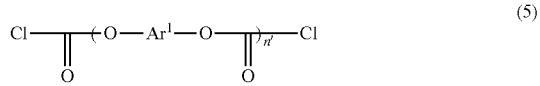 (5)

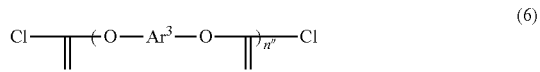 (6)

 (7)

In the formulae, $Ar^1$ is a group represented by the formula (2). $Ar^2$ and $Ar^3$ are a divalent group having an aromatic group. $Ar^2$ and $Ar^3$ may be the same or different. However, $Ar^1$ is not the same as $Ar^2$ and $Ar^3$. n' is a numeral of 1.0 to 1.99. n" is 0 or a numeral of 1.0 to 4.0.

Herein, n' representing the average number of the monomer units of the bischloroformate oligomer is different from n in the formulae (1) and (100). In comparison between n and n', n is typically larger than n' as shown in Examples below. This is because, when the manufactured bischloroformate oligomer in which the $Ar^1$ block is formed reacts with a monomer including $Ar^2$ and chain ends, the chloroformate group at the end of the $Ar^1$ oligomer may react with the base present in the reaction system to form a hydroxyl group, resulting in polycondensation of the hydroxyl group with another $Ar^1$ oligomer having chlorine at its end. n" representing the average number of the monomer units of the bischloroformate oligomer is also different from m in the formula (1).

In the bischloroformate oligomer of the formula (5), the average number of the monomer units if is in a range of 1.0 to 1.99. n' is favorably in a range of 1.0 to 1.70. In the bischloroformate oligomer of the formula (6), the average number of the monomer units n" is 0 or in a range of 1.0 to 4.0. Herein, the phrase that "n" is 0" means that the bischloroformate oligomer of the formula (6) is not to be used. The average number of the monomer units is favorably in a range of 1.0 to 3.0. The PC copolymer according to this exemplary embodiment is easily manufactured by using the bischloroformate oligomer having the average number of the monomer units in the above range. A method for calculating the average number of the monomer units is exemplified by a method described later in Examples.

The material including the bischloroformate oligomer represented by the formulae (5) and (6) may occasionally contain an amide compound as an impurity. A content of the amide compound is calculated based on a mass of nitrogen atoms contained in the material including the bischloroformate oligomer. When the solvent is removed from the solution including the material to obtain solids, the content of the amide compound (the mass of nitrogen derived from the amide compound) is 700 mass ppm or less, preferably 400 mass ppm or less, more preferably 150 mass ppm or less, particularly preferably 80 mass ppm or less based on the total mass of the material including the bischloroformate oligomer.

When the content of the amide compound is 700 mass ppm or less, increase in residual potential of the electrophotographic photoreceptor can be restrained when the PC copolymer is used as a binder resin for the electrophotographic photoreceptor. The bischloroformate oligomer may be liquid as well as solids.

Examples of the amide compound are N,N,N',N'-tetraalkyl urea, N,N-dialkylcarbamate chloride such as N,N-diethylcarbamate chloride, N,N-dialkylcarbamate, a polymer of bisphenol-monochloroformate-monoalkylcarbamate and bisphenol-bisdialkylcarbamate.

When a large amount of an amine compound such as triethylamine is used for manufacturing the bischloroformate oligomer, the amine compound and the bischloroformate compound react with each other to occasionally form the amide compound as impurities.

However, as described above, the content of the amide compound can be decreased by increasing the number of times for cleaning the bischloroformate oligomer.

In addition to water-cleaning, distillation, an adsorbent and column fractionation are applied for reducing the content of the amide compound.

The PC copolymer obtained using the material including the bischloroformate oligomer may also occasionally contain dialkylcarbamate chloride such as diethylcarbamate chloride as impurities. In this case, the content of dialkylcarbamate chloride is 100 mass ppm or less, preferably 50 mass ppm or less, more preferably 40 mass ppm or less based on the total mass of the PC copolymer.

When the content of dialkylcarbamate chloride is 100 mass ppm or less, increase in residual potential is restrained to provide an electrophotographic photoreceptor having a favorable sensitivity.

Manufacturing Method of PC Copolymer

The manufacturing method of the PC copolymer according to this exemplary embodiment is exemplified by polycondensation of a bischloroformate oligomer derived from a divalent phenol compound represented by the following formula (15) and, as needed, the formula (16) and a divalent phenol compound represented by the following formula (17) and having a skeleton different from that of the above divalent phenol compound in the presence of a phenol compound or fluorine-containing alcohol compound for terminating the chain end group.

$$HO-Ar^1-OH \quad (15)$$

$$HO-Ar^3-OH \quad (16)$$

$$HO-Ar^2-OH \quad (17)$$

As the bischloroformate oligomer to be used in the PC copolymer according to the exemplary embodiment, the bischloroformate oligomer derived from the formula (15) may be used alone, or a bischloroformate co-oligomer derived from the formulae (15) and (16) may be used. Further, the bischloroformate oligomers respectively derived from the formulae (15) and (16) may be blended.

However, when the molar copolymer composition represented by $Ar^1/(Ar^1+Ar^2+Ar^3)$ in the PC copolymer according to the exemplary embodiment is 50 mol % to 67 mol %, the bischloroformate oligomer derived from the formula (15) is singularly used, but the bischloroformate oligomer derived from the formula (16) or the bischloroformate co-oligomer derived from the formulae (15) and (16) are not typically used. $Ar^2$ and $Ar^3$ may be the same or different. However, $Ar^1$ is not the same as $Ar^2$ and $Ar^3$.

The monomer represented by the formula (15) (divalent phenol compound) is exemplified by a biphenol compound. Specific examples of the biphenol compound are 4,4'-biphenol, 3,3'-dimethyl-4,4'-biphenol, 3,3',5-trimethyl-4,4'-biphenol, 3-propyl-4,4'-biphenol, 3,3',5,5'-tetramethyl-4,4'-biphenol, 3,3'-diphenyl-4,4'-biphenol and 3,3'-dibutyl-4,4'-biphenol. Among the above examples, 4,4'-biphenol and 3,3'-dimethyl-4,4'-biphenol are preferable. When the biphenol compound is applied to the PC copolymer for the electrophotographic photoreceptor, wear resistance of the PC copolymer is enhanced.

The monomer represented by the formula (16) (divalent phenol compound) is exemplified by a bisphenol compound and a naphthalenediol compound. Examples of the bisphenol compound are 1,1-bis(3-methyl-4-hydroxyphenyl)ethane, 9,9-bis(3-phenyl-4-hydroxyphenyl)fluorene, bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(3-methyl-4-hydroxyphenyl)butane, 2,2-bis(4-hydroxyphenyl)butane, 2,2-bis(4-hydroxyphenyl)octane, 4,4-bis(4-hydroxyphenyl)heptane, 1,1-bis(4-hydroxyphenyl)-1,1-diphenyl methane, 1,1-bis(4-hydroxyphenyl)-1-phenyl ethane, 1,1-bis(4-hydroxyphenyl)-1-phenyl methane, bis(4-hydroxyphenyl)ether, bis(4-hydroxyphenyl)sulfide, bis(4-hydroxyphenyl)sulfone, 1,1-bis(4-hydroxyphenyecyclo-pentane, 1,1-bis(3-methyl-4-hydroxyphenyl)cyclopentane, 1,1-bis(4-hydroxyphenyl)cyclohexane, 1,1-bis(4-hydroxyphenyl)-3,3,5-trimethylcyclohexane, 1,1-bis(4-hydroxyphenyl)cyclododecane, 2,2-bis(3-methyl-4-hydroxyphenyl)propane, 2,2-bis(3-phenyl-4-hydroxyphenyl)propane, 2,2-bis(4-hydroxyphenyl)adamantane, 2,2-bis(3-methyl-4-hydroxyphenyl)adamantane, 1,3-bis(4-hydroxyphenyl)adamantane, 1,3-bis(3-methyl-4-hydroxyphenyl)adamantane, 2-(3-methyl-4-hydroxyphenyl)-2-(4-hydroxyphenyl)-1-phenyl ethane, bis(3-methyl-4-hydroxyphenyl)sulfide, bis(3-methyl-4-hydroxyphenyl)sulfone, bis(3-methyl-4-hydroxyphenyl)methane, 1,1-bis(3-methyl-4-hydroxyphenyl)cyclohexane, 2,7-naphthalenediol, 2,6-naphthalenediol, 1,4-naphthalenediol, 1,5-naphthalenediol, 2,2-bis(2-methyl-4-hydroxyphenyl)propane, 1,1-bis(2-butyl-4-hydroxy-5-methylphenyl)butane, 1,1-bis(2-tert-butyl-4-hydroxy-3-methylphenyl)ethane, 1,1-bis(2-tert-butyl-4-hydroxy-5-methylphenyl)propane, 1,1-bis(2-tert-butyl-4-hydroxy-5-methylphenyl)butane, 1,1-bis(2-tert-butyl-4-hydroxy-5-methylphenyl)isobutane, 1,1-bis(2-tert-butyl-4-hydroxy-5-methylphenyl)heptane, 1,1-bis(2-tert-butyl-4-hydroxy-5-methylphenyl)-1-phenyl methane, 1,1-bis(2-tert-amyl-4-hydroxy-5-methylphenyl)butane, bis(3-chloro-4-hydroxyphenyl)methane, bis(3,5-dibromo-4-hydroxyphenyl)methane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(3-bromo-4-hydroxy-5-chlorophenyl)propane, 2,2-bis(3,5-dichloro-4-hydroxyphenyl)butane, 2,2-bis(3,5-dibromo-4-hydroxyphenyl)butane, 1-phenyl-1,1-bis(3-fluoro-4-hydroxyphenyl)ethane, bis(3-fluoro-4-hydroxyphenyl)ether, 3.3'-difluoro-4,4'-dihydroxy biphenyl, 1,1-bis(3-cyclohexyl-4-hydroxyphenyl)cyclohexane, 2,2-bis(4-hydroxyphenyl) hexafluoro propane, 1,1-bis(3-phenyl-4-hydroxyphenyl)cyclohexane, bis(3-phenyl-4-hydroxyphenyl)sulfone, 4.4'-(3,3,5-trimethylcyclohexylidene)diphenol, 4.4'-[1,4-phenylene bis(1-methyl ethylidene)]bisphenol, 4.4'-[1,3-phenylene bis (1-methylethylidene)]bisphenol, 9,9-bis(4-hydroxyphenyl)fluorene, 9,9-bis(4-hydroxy-3-methylphenyl)fluorene, and α,α'-bis(4-hydroxyphenyl)-1,3-diisopropyl benzene.

Among the above bisphenol compounds, 1,1-bis(4-hydroxyphenyl)ethane, 2,2-bis(4-hydroxyphenyl)butane, 2,2-bis(4-hydroxyphenyl)propane, 1,1-bis(4-hydroxyphenyl)-1,1-diphenyl methane, 1,1-bis(4-hydroxyphenyl)-1-phenyl ethane, 1,1-bis(4-hydroxyphenyl)cyclohexane, 2,2-bis(3-methyl-4-hydroxyphenyl)propane, 1,1-bis(3-methyl-4-hydroxyphenyl)cyclohexane, 1,1-bis(4-hydroxyphenyl)-3,3,5-trimethylcyclohexane, 1,1-bis(4-hydroxyphenyl)cyclododecane, 1,1-bis(3-methyl-4-hydroxyphenyl)cyclopentane, 2,2-bis(3-phenyl-4-hydroxyphenyl)propane, 2,2-bis(4-hydroxyphenyl)adamantine, 4.4'-[1,4-phenylene bis(1-methylethylidene)]bisphenol, 4,4'-[1,3-phenylene bis (1-methylethylidene)]bisphenol, 9,9-bis(4-hydroxyphenyl)fluorene, 9,9-bis(4-hydroxy-3-methylphenyl)fluorene, bis(4-hydroxyphenyl)ether, and bis(4-hydroxyphenyl)sulfide are preferable.

More preferable examples are 1,1-bis(4-hydroxyphenyl)ethane, 2,2-bis(4-hydroxyphenyl)butane, 2,2-bis(4-hydroxyphenyl)propane, 1,1-bis(4-hydroxyphenyl)-1-phenyl ethane, 1,1-bis(4-hydroxyphenyl)cyclohexane, 2,2-bis(3-methyl-4-hydroxyphenyl)propane, 1,1-bis(3-methyl-4-hydroxyphenyl)cyclohexane, 1,1-bis(3-methyl-4-hydroxyphenyl)-3,3,5-trimethylcyclohexane, 1,1-bis(4-hydroxyphenyl)cyclododecane, 2,2-bis(4-hydroxyphenyl)adamantane, and 9,9-bis(4-hydroxy-3-methylphenyl)ether.

The monomer represented by the formula (17) (divalent phenol compound) is exemplified by a bisphenol compound and a naphthalenediol compound. Examples of the bisphenol compound are 1,1-bis(3-methyl-4-hydroxyphenyl)ethane, 9,9-bis(3-phenyl-4-hydroxyphenyl)fluorene, bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(3-methyl-4-hydroxyphenyl)butane, 2,2-bis(4-hydroxyphenyl)butane, 2,2-bis(4-hydroxyphenyl)octane, 4,4-bis(4-hydroxyphenyl)heptane, 1,1-bis(4-hydroxyphenyl)-1,1-diphenyl methane, 1,1-bis(4-hydroxyphenyl)-1-phenyl ethane, 1,1-bis(4-hydroxyphenyl)-1-phenyl methane, bis(4-hydroxyphenyl)ether, bis(4-hydroxyphenyl)sulfide, bis(4-hydroxyphenyl)sulfone, 1,1-bis(4-hydroxyphenyl)cyclopentane, 1,1-bis(3-methyl-4-hydroxyphenyl)cyclopentane, 1,1-bis(4-hydroxyphenyl)cyclohexane, 1,1-bis(4-hydroxyphenyl)-3,3,5-trimethylcyclohexane, 1,1-bis(4-hydroxyphenyl)cyclododecane, 2,2-bis(3-methyl-4-hydroxyphenyl)propane, 2,2-bis(3-phenyl-4-hydroxyphenyl)propane, 2,2-bis(4-hydroxyphenyl)adamantane, 2,2-bis(3-methyl-4-hydroxyphenyl)adamantane, 1,3-bis(4-hydroxyphenyl)adamantane, 1,3-bis(3-methyl-4-hydroxyphenyl)adamantane, 2-(3-methyl-4-hydroxyphenyl)-2-(4-hydroxyphenyl)-1-phenyl ethane, bis(3-methyl-4-hydroxyphenyl)sulfide, bis(3-methyl-4-hydroxyphenyl)sulfone, bis(3-methyl-4-hydroxyphenyl)methane, 1,1-bis(3-methyl-4-hydroxyphenyl)cyclohexane, 2,7-naphthalenediol, 2,6-naphthalenediol, 1,4-naphthalenediol, 1,5-naphthalenediol, 2,2-bis(2-methyl-4-hydroxyphenyl)propane, 1,1-bis(2-butyl-4-hydroxy-5-methylphenyl)butane, 1,1-bis(2-tert-butyl-4-hydroxy-3-methylphenyl)ethane, 1,1-bis(2-tert-butyl-4-hydroxy-5-methylphenyl)propane, 1,1-bis(2-tert-butyl-4-hydroxy-5-methylphenyl)butane, 1,1-bis(2-tert-butyl-4-hydroxy-5-methylphenyl)isobutane, 1,1-bis(2-tert-butyl-4-hydroxy-5-methylphenyl)heptane, 1,1-bis(2-tert-butyl-4-hydroxy-5-methylphenyl)-1-phenyl methane, 1,1-bis(2-tert-amyl-4-hydroxy-5-methylphenyl)butane, bis(3-chloro-4-hydroxyphenyl)methane, bis(3,5-dibromo-4-hydroxyphenyl)methane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(3-bromo-4-hydroxy-5-chlorophenyl)propane, 2,2-bis(3,5-dichloro-4-hydroxyphenyl)butane, 2,2-bis(3,5-dibromo-4-hydroxyphenyl)butane, 1-phenyl-1,1-bis(3-fluoro-4-hydroxyphenyl)ethane, bis(3-fluoro-4-hydroxyphenyl)ether, 3.3'-difluoro-4,4'-dihydroxy biphenyl, 1,1-bis(3-cyclohexyl-4-hydroxyphenyl)cyclohexane, 2,2-bis(4-hydroxyphenyl) hexafluoro propane, 1,1-bis(3-phenyl-4-hydroxyphenyl)cyclohexane, bis(3-phenyl-4-hydroxyphenyl)sulfone, 4.4'-(3,3,5-trimethylcyclohexylidene)diphenol, 4.4'-[1,4-phenylene bis(1-methylethylidene)]bisphenol, 4.4'-[1,3-phenylene bis(1-methylethylidene)]bisphenol, 9,9-bis(4-hydroxyphenyl)fluorene, 9,9-bis(4-hydroxy-3-methylphenyl)fluorene, and α,α'-bis(4-hydroxyphenyl)-1,3-diisopropyl benzene. One of the above bisphenol compounds may be singularly used, or two or more of them may be mixed for use.

Among the above bisphenol compounds, 1,1-bis(4-hydroxyphenyl)ethane, 2,2-bis(4-hydroxyphenyl)butane, 2,2-bis(4-hydroxyphenyl)propane, 1,1-bis(4-hydroxyphenyl)-1,1-diphenyl methane, 1,1-bis(4-hydroxyphenyl)-1-phenyl ethane, 1,1-bis(4-hydroxyphenyl)cyclohexane, 2,2-bis(3-methyl-4-hydroxyphenyl)propane, 1,1-bis(3-methyl-4-hydroxyphenyl)cyclohexane, 1,1-bis(4-hydroxyphenyl)-3,3,5-trimethylcyclohexane, 1,1-bis(4-hydroxyphenyl)cyclododecane, 1,1-bis(3-methyl-4-hydroxyphenyl)cyclopentane, 2,2-bis(3-phenyl-4-hydroxyphenyl)propane, 2,2-bis(4-hydroxyphenyl)adamantine, 4.4'-[1,4-phenylene bis(1-methylethylidene)]bisphenol, 4,4'-[1,3-phenylene bis (1-methylethylidene)]bisphenol, 9,9-bis(4-hydroxyphenyl) fluorene, 9,9-bis(4-hydroxy-3-methylphenyl)fluorene, bis(4-hydroxyphenyl)ether, bis(4-hydroxyphenyl)sulfide are preferable.

More preferable examples are 1,1-bis(4-hydroxyphenyl) ethane, 2,2-bis(4-hydroxyphenyl)butane, 2,2-bis(4-hydroxyphenyl)propane, 1,1-bis(4-hydroxyphenyl)-1-phenyl ethane, 1,1-bis(4-hydroxyphenyl)cyclohexane, 2,2-bis(3-methyl-4-hydroxyphenyl)propane, 1,1-bis(3-methyl-4-hydroxyphenyl)cyclohexane, 1,1-bis(3-methy-4-hydroxyphenyl)-3,3,5-trimethylcyclohexane, 1,1-bis(4-hydroxyphenyl) cyclododecane, 2,2-bis(4-hydroxyphenyl)adamantane, and 9,9-bis(4-hydroxy-3-methylphenyl)ether.

The PC copolymer according to this exemplary embodiment is obtainable by conducting interfacial polycondensation and the like using the monomer represented by the formula (17) and either the bischloroformate oligomer obtained from the formula (15) or a combination of the bischloroformate oligomer obtained from the formula (15) and the bischloroformate oligomer obtained from the formula (16). When an interfacial polycondensation is conducted under the presence of an acid binding agent with use of various carbonyl dihalides such as phosgene, diphosgene and triphosgene, carbonate ester bonding can be favorably formed.

In the interfacial polycondensation, it has been conventionally considered that a required amount of the acid binding agent is 1 equivalent or more per 1 mol of total hydroxyl groups of the monomer of the formula (17), preferably from 1 equivalent to 10 equivalents. However, it has been found that a mol number of the bischloroformate oligomer needs to be considered in order to stably manufacture the PC copolymer. It is effective to estimate a use ratio of the acid binding agent for stably manufacturing the PC copolymer so that a value X of the acid binding agent falls in a range of 1.1 to 1.3, the value X being calculated according to the following calculation formula (Numerical Formula 1) in consideration of stoichimetric proportion in the reaction. In the following formula (Numerical Formula 1), the mole number of the bischloroformate oligomer is represented by Mc (mol), a mole number of the divalent phenol monomer is represented by Mp (mol), a mole number of the acid binding agent is represented by Mo (mol), and a valence of the acid binding agent is represented by Y.

$$X = Mo \cdot Y / (2Mc - 2Mp) \quad \text{(Numerical Formula 1)}$$

When the value X of the acid binding agent exceeds 1.3, the bischloroformate oligomer derived from the formula (15) representing the material of the PC copolymer according to the exemplary embodiment is highly possible to be easily decomposed by the acid binding agent to be crystallized. When the value X is less than 1.1, polymerization does not proceed due to shortage of the acid binding agent, so that the reduced viscosity of the PC copolymer is not increased. Moreover, due to a poor polymerization, highly polar and highly reactive groups (e.g., OH group) excessively remain at the ends of the PC copolymer. For instance, when the PC copolymer is used as a binder resin for an electrophotographic photoreceptor, such groups are likely to deteriorate electric characteristics. Accordingly, the value of the acid binding agent of 1.1 to 1.3 is effective for stably promoting polymerization.

The above reaction(s) is conducted under the presence of a terminal terminator and/or a branching agent as needed.

Moreover, in manufacturing the PC copolymer according to this exemplary embodiment, two or more kinds of monomers derived from Ar² may be used to provide a multicomponent copolymer.

As the terminal terminator for terminating the chain end, monovalent carboxylic acid and derivatives thereof, and monovalent phenol are usable. For instance, p-tert-butyl-phenol, p-phenyl-phenol, p-cumylphenol, p-perfluoro nonylphenol, p-(perfluoro nonyl phenyl)phenol, p-(perfluorohexyl) phenol, p-tert-perfluorobutyl phenol, perfluorooctyl phenol, 1-(p-hydroxybenzyl)perfluorodecane, p-[2-(1H,1H-perfluorotridodecyloxy)-1,1,1,3,3,3-hexafluoro propyl]phenol, 3,5-bis(perfluoro hexyloxy carbonyl)phenol, p-hydroxy perfluoro dodecyl benzoate, p-(1H,1H-perfluoro octyloxy) phenol, 2H,2H,9H-perfluoro nonane acid, 1,1,1,3,3,3-tetraphloro-2-propanol, or alcohols represented by the following formulae (18) and (19) are preferably used.

(n is an integer of 1 to 12.)

(m is an integer of 1 to 12.)

A ratio at which the terminal terminator is added is in a range of 0.05 mol % to 30 mol % per the copolymer composition, more preferably of 0.1 mol % to 10 mol %. When the ratio is more than 30 mol %, mechanical strength may be deteriorated. When the content is less than 0.05 mol %, moldability may be deteriorated.

Examples of the branching agent are phloroglucin, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl)heptane, 1,3,5-tris(2-hydroxyphenyl)benzene, 1,3,5-tris(4-hydroxyphenyl)benzene, 1,1,1-tris(4-hydroxyphenyl)ethane, tris(4-hydroxyphenyl)phenylmethane, 2,2-bis[4,4-bis(4-hydroxyphenyl)cyclohexyl]propane, 2,4-bis[2-bis(4-hydroxyphenyl)-2-propyl]phenol, 2,6-bis(2-hydroxy-5-methylbenzyl)-4-methylphenol, 2-(4-hydroxyphenyl)-2-(2, 4-dihydroxyphenyl)propane, tetrakis(4-hydroxyphenyl) methane, tetrakis[4-(4-hydroxyphenyl isopropyl)phenoxy] methane, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl)oxyindole, 5-chloroisatin, 5,7-dichloroisatin and 5-bromoisatin.

An additive amount of the branching agent is preferably 30 mol % or less per the copolymer composition, more preferably 5 mol % or less. When the additive amount is more than 30 mol %, moldability may be deteriorated.

Examples of the acid binding agent usable in interfacial polycondensation are: alkaline metal hydroxides such as sodium hydroxide, potassium hydroxides, lithium hydroxides and cesium hydroxide; alkaline earth metal hydroxides such as magnesium hydroxide and calcium hydroxide; carbonates such as sodium carbonate, potassium carbonate, calcium carbonate and magnesium carbonate; and organic bases such as trialkylamines (triethylamine, trimethylamine and tripropylamine), N-methyl morpholine, tetramethylethylenediamine, triethylenediamine, diazabicycloundecene, dimethylaniline, diethylaniline, dipropylaniline and pyridine. Among these, alkaline metal hydroxides such as sodium hydroxide, potassium hydroxides and alkaline earth metal hydroxides such as calcium hydroxide, and amine compounds such as triethylamine, dimethylaniline and diethylaniline are preferable. These acid binding agents can be used in mixture.

Preferable examples of the solvent to be used herein are: aromatic hydrocarbon such as toluene and xylene; halogenated hydrocarbon such as methylene chloride, chloroform, 1,1-dichloroethane, 1,2-dichloroethane, 1,1,1-trichloroethane, 1,1,2-trichloroethane, 1,1,1,2-tetrachloroethane, 1,1,2,2,-tetrachloroethane, pentachloroethane and chlorobenzene; ketones such as cyclohexaneone, acetone and acetophenone; and ethers such as tetrahydrofuran and 1,4-dioxane. One of the above solvents may be singularly used, or two or more of the above may be used together. With use of two solvents that are not miscible with each other, interfacial polycondensation may be conducted.

Preferable examples of a catalyst are: tertiary amines such as trimethylamine, triethylamine, tributylamine, N,N-dimethylcyclohexyl amine, pyridine, N,N-diethyl aniline and N,N-dimethyl aniline; quaternary ammonium salts such as trimethyl benzyl ammonium chloride, triethyl benzyl ammonium chloride, tributyl benzyl ammonium chloride, trioctyl methyl ammonium chloride, tetrabutyl ammonium chloride and tetrabutyl ammonium bromide; and quaternary phosphonium salts such as tetrabutyl phosphonium chloride and tetrabutyl phosphonium bromide.

Further, a small amount of an antioxidant such as sodium sulfite and hydrosulfite salt may be added to the reaction system as needed.

The manufacturing method of the PC copolymer according to this exemplary embodiment is specifically applicable in various embodiments. For instance, the bischloroformate oligomer represented by the formula (5) is manufactured by reacting the biphenol compound represented by the formula (15) with phosgene, and then the manufactured bischloroformate oligomer is reacted with the monomer represented by the formula (17) in the presence of a mixture of the above solvent and an alkali aqueous solution (the acid binding agent). This method is preferable in that n in the formulae (100) and (1) is adjustable to a preferable range.

The following method of manufacturing the bischloroformate oligomer represented by the formula (15) is preferable in that a cleaning process in manufacturing the polycarbonate copolymer can be simplified.

A manufacturing method of the bischloroformate oligomer having n' in the formula (5) in a range of 1.0 to 1.99 is exemplified by the following manufacturing method. Firstly, the biphenol compound of the formula (15) is suspended in a hydrophobic solvent such as methylene chloride and then added with phosgene to form a mixed solution. On the other hand, a tertiary amine such as triethylamine is dissolved in a hydrophobic solvent such as methylene chloride to form a solution. The solution is dropped into the above mixed solution for reaction, preferably, at the room temperature or less. Hydrochloric acid and deionized water are added to the obtained reactant mixture to be cleaned. An organic layer including a polycarbonate oligomer having a small number of monomer units is obtained. Alternatively, after the hydrophobic solvent is removed from the obtained reactant mixture to some extent, hydrochloric acid and deionized water may be added to be cleaned.

A reaction temperature is typically in a range of 0 to 70 degrees C. under cooling, preferably of 5 to 40 degrees C. Both dropping time and reaction time are in a range of 15 minutes to 4 hours, preferably of 30 minutes to about 3 hours. The bischloroformate oligomer thus obtained preferably has an average number of monomer units (n') in a range of 1.00 to 1.99, more preferably of 1.00 to 1.70.

The divalent phenol monomer having a different skeleton and represented by the formula (17) is added to an organic phase containing the bischloroformate oligomer thus obtained having a small number of monomer units to be reacted. The reaction temperature is 0 to 150 degrees C., preferably 5 to 40 degrees C., particularly preferably 10 to 25 degrees C.

A reaction pressure may be any one of a reduced pressure, a normal pressure and an added pressure. Typically, the reaction can be favorably performed under a pressure that is approximately equal to the normal pressure or a self-pressure of the reaction system. The reaction time, which is dependant on the reaction temperature, is typically in a range of 0.5 minute to 10 hours, preferably of 1 minute to 3 hours.

In the reaction, the divalent phenol monomer represented by the formula (17) is desirably added in a form of an aqueous solution or an organic-solvent solution. The order of the addition is not specifically limited. In the above manufacturing method, the catalyst, the terminal terminator, the branching agent and the like may be added as needed at the time of manufacturing a bischloroformate oligomer or at the time of subsequent polymerization reaction, or both at the time of manufacturing the bischloroformate oligomer and at the time of subsequent polymerization reaction.

When the PC copolymer contains the bischloroformate oligomer obtained from the formula (16), for instance, the bisphenol compound represented by the formula (16) is reacted with phosgene to manufacture the bischloroformate oligomer represented by the formula (6) and having a small number of monomer units. Subsequently, applicable is a method in which this bischloroformate oligomer having a small number of the monomer units and the bischloroformate oligomer obtained from the formula (15) and having a small number of the monomer units are mixed, and then the mixture is reacted with the monomer represented by the formula (17) in the presence of a mixture of the above solvent and the alkali aqueous solution of the above acid binding agent.

In the manufacturing of the PC copolymer according to the exemplary embodiment, the bischloroformate oligomer obtained from the formula (16) preferably has the average number of the monomer units n" in a range of 1.0 to 4.0. Since the material obtained from the formula (16) may be hydrolyzed by alkali depending on polymerization conditions, n" is more preferably in a range of 1.0 to 3.0. The manufacturing method of the above oligomer is exemplified by the following manufacturing examples.

Firstly, the bisphenol compound of the formula (16) is suspended in a hydrophobic solvent such as methylene chloride and then added with phosgene to form a mixed solution. On the other hand, a tertiary amine such as triethylamine is dissolved in a hydrophobic solvent such as methylene chloride to form a solution. The solution is dropped into the above mixed solution for reaction, preferably, at the room temperature or less. Hydrochloric acid and deionized water are added to the obtained reactant mixture for cleaning. An organic layer including a bischloroformate oligomer having a small number of the monomer units is obtained. Alternatively, after the hydrophobic solvent is removed from the obtained reactant mixture to some extent, hydrochloric acid and deionized water may be added for cleaning.

A reaction temperature is typically in a range of 0 to 70 degrees C. under cooling, preferably of 5 to 40 degrees C. Both dropping time and reaction time are in a range of 15 minutes to 4 hours, preferably of 30 minutes to about 3 hours. The bischloroformate oligomer thus obtained preferably has an average number of monomer units (n") in a range of 1.0 to 4.0, more preferably of 1.00 to 3.00, particularly preferably of 1.00 to 1.99. It should be noted that n" never exceeds 4.0 according to this manufacturing method.

When the PC copolymer is manufactured only using the bischloroformate oligomer having 1.0 to 1.99 of the monomer units represented by the formula (5) without using the bischloroformate oligomer represented by the formula (6), the content of $Ar^1$ in the PC copolymer can be 50 mol % or more, but cannot be 50 mol % or less. By using the bischloroformate oligomer represented by the formula (6) at the same time, a ratio of the $Ar^1$ skeleton near the chain ends may be decreased to make $Ar^1$ less than 50%.

The PC copolymer thus obtained is formed of the monomer units represented by the following formulae (20) to (22). According to this manufacturing method, the ratio of the hydroxyl groups at all the ends can be reliably made 20 mol % or less in the PC copolymer. It should be noted that n in the formula (20) is the same as n in the formula (100) or (1) and m in the formula (21) is the same as m in the formula (1).

As long as an object of the invention is not hampered, the PC copolymer may contain a polycarbonate unit having a structure unit other than those of the formulae $Ar^1$, $Ar^2$ and $Ar^3$ or a unit having a polyester structure or a polyether structure.

[Formula 25]

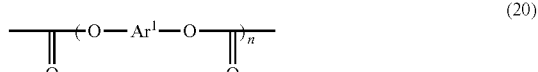

(20)

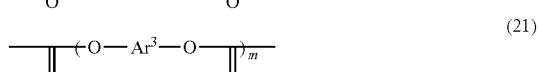

(21)

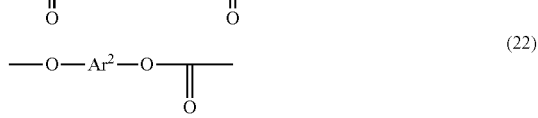

(22)

For controlling the reduced viscosity $[\eta_{sp}/C]$ of the obtained PC copolymer to be within the above-described range, various methods, such as a method of selecting the reaction conditions and a method of adjusting the use amount of the branching agent and the terminal terminator, are available. In addition, if necessary, the PC copolymer may be subjected to a physical treatment such as mixing and cutoff and/or a chemical treatment such as polymer reaction, cross linking or partial degradation, so that the PC copolymer having a predetermined reduced viscosity $[\eta_{sp}/C]$ may be obtained.

The obtained reaction product (crude product) may be subjected to various aftertreatments such as known separation and refinement, so that the PC copolymer having desirable purity (desirable refining degree) may be obtained.

Structure of Coating Liquid

A coating liquid according to this exemplary embodiment at least contains the PC copolymer according to this exemplary embodiment and a solvent capable of dissolving or dispersing the PC copolymer according to this exemplary embodiment. Moreover, in addition to the above, the coating liquid may contain a low molecular compound, a colorant such as a dye and a pigment, a functional compound such as a charge transporting material, an electron transporting material, a hole transporting material and a charge generating material, a filler such as an inorganic or organic filler, fiber and particles, and an additive such as an antioxidant, a UV absorbent and an acid scavenger. Materials that may be contained besides the resin are exemplified by materials contained in the components for the electrophotographic photoreceptor described later. The coating liquid may contain other resins as long as the advantages of this exemplary embodiment are not hampered. The coating liquid is exemplified by the following components of the electrophotographic photoreceptor. As the solvent usable in this exemplary embodiment, a single solvent may be used or a plurality of solvents may be used by mixture, considering solubility, dispersibility, viscosity, evaporation speed, chemical stability and stability against physical changes of the PC copolymer according to this exemplary embodiment and other material. The solvent is exemplified by the components of the electrophotographic photoreceptor described later.

The solvent is exemplified by a later-described solvent to be used for forming the charge generating layer and the charge transporting layer.

The concentration of the copolymer component in the coating liquid is sufficient when the coating liquid can exhibit a viscosity suitable for usage. The concentration is preferably in a range of 0.1 mass % to 40 mass %, more preferably of 1 mass % to 35 mass %, most preferably of 5 mass % to 30 mass %. When the concentration exceeds 40 mass %, coating performance is deteriorated due to excessively high viscosity. When the viscosity is less than 0.1 mass %, the coating liquid may flow away due to excessively low viscosity, so that a uniform film cannot be obtained. For drying the obtained film, long time may be required due to excessively low concentration of the coating liquid, so that a desired thickness of the film may not be obtained.

The PC copolymer according to this exemplary embodiment has a good compatibility with the charge transporting material and is not whitened or gelled even when dissolved in the solvent. Accordingly, the coating liquid according to this exemplary embodiment containing the copolymer, the charge transporting material and the solvent can be stably stored without whitening or gelation of the polymer components over a long period of time. When a photosensitive layer of the electrophotographic photoreceptor is formed with use of the coating liquid, an excellent electrophotographic photoreceptor having no defect on an image without crystallization of the photosensitive layer is obtainable.

A ratio of the PC copolymer to the charge transporting material in the coating liquid is typically 20:80 to 80:20 by mass, preferably 30:70 to 70:30 by mass.

In the coating liquid according to this exemplary embodiment, one of the PC copolymer according to this exemplary embodiment may be singularly used, or two or more of the above PC copolymer may be used together.

The coating liquid according to this exemplary embodiment is preferably used for forming the charge transporting layer of a laminated electrophotographic photoreceptor in which a sensitive layer at least includes the charge generating layer and the charge transporting layer. When the coating liquid further contains the charge generating material, the coating liquid is also usable for forming a sensitive layer of a single-layer electrophotographic photoreceptor.

Structure of Electrophotographic Photoreceptor

As long as the above-described PC copolymer is used in a photosensitive layer, the electrophotographic photoreceptor according to this exemplary embodiment may be any electrophotographic photoreceptor (e.g. one of known various electrophotographic photoreceptors). However, the photosensitive layer of the electrophotographic photoreceptor is preferably a layered electrophotographic photoreceptor including at least one charge generating layer and at least one charge transporting layer, or alternatively the photosensitive layer of the electrophotographic photoreceptor is preferably a single-layer electrophotographic photoreceptor including both a charge generating material and a charge transporting material.

While the PC copolymer may be used in any portion of the photosensitive layer, in order for the invention to sufficiently provide an advantage, the copolymerized PC is preferably used as the binder resin of the charge transporting material, as the binder resin of the single photosensitive layer or as a surface protecting layer. When the electrophotographic photoreceptor has double charge transporting layers (i.e., multilayer electrophotographic photoreceptor), the PC copolymer is preferably used in either one of the charge transporting layers.

In the electrophotographic photoreceptor according to this exemplary embodiment, one type of the PC copolymer according to this exemplary embodiment may be singularly used, or two or more types thereof may be used together. Further, as long as an object of the invention is not hampered, a binder-resin component such as another polycarbonate may be contained as desired. In addition, an additive such as an antioxidant may be contained.

The electrophotographic photoreceptor according to this exemplary embodiment includes a conductive substrate and a photosensitive layer on the conductive substrate. When the photosensitive layer has the charge generating layer and the charge transporting layer, the charge transporting layer may be laminated on the charge generating layer, or the charge generating layer may be laminated on the charge transporting layer. Further alternatively, a single layer of the electrophotographic photoreceptor may contain both the charge generating material and the charge transporting material. When necessary, a surface layer of the electrophotographic photoreceptor may be provided with a conductive or insulating protective film. The electrophotographic photoreceptor may be further provided with an intermediate layer(s) such as adhesive layer for enhancing adhesion between layers and blocking layer for blocking charges.

Various conductive substrate materials (e.g., known materials) are usable for forming the electrophotographic photoreceptor according to this exemplary embodiment. Examples of such conductive substrate materials are: a plate, a drum and a sheet made of material such as aluminum, nickel, chrome, palladium, titanium, molybdenum, indium, gold, platinum, silver, copper, zinc, brass, stainless steel, lead oxide, tin oxide, indium oxide, ITO (indium tin oxide; tin-doped indium oxide) and graphite; glass, cloth, paper, plastic film, plastic sheet and seamless belt having been treated with conductive treatment through coating by vapor deposition, sputtering or application; and a metal drum having been treated with metal oxidation treatment by electrode oxidation and the like.

The charge generating layer contains at least the charge generating material. The charge generating layer can be obtained by forming a layer of the charge generating material on the underlying substrate by vacuum deposition, sputtering or the like, or by forming a layer in which the charge generating material is bound onto the underlying substrate with use of a binder resin. While various methods (e.g., known methods) are usable for forming the charge generating layer with use of a binder resin, the charge generating layer is preferably obtained as a wet molding typically formed by applying, for instance, a coating agent in which both the charge generating material and the binder resin are dispersed or dissolved in a suitable solvent onto a predetermined underlying substrate and drying the applied coating agent.

Various known materials are usable as the charge generating material in the charge generating layer. Examples of such materials are: elementary selenium such as amorphous selenium and trigonal selenium; selenium alloy such as selenium-tellurium; selenium compound or selenium-containing composition such as $As_2Se_3$; inorganic material formed of 12 group element and 16 group element in the periodic system such as zinc oxide and CdS—Se; oxide-base semiconductor such as titanium oxide; silicon-base material such as amorphous silicon; metal-free phthalocyanine pigment such as τ-type metal-free phthalocyanine and χ-type metal-free phthalocyanine; metal phthalocyanine pigment such as α-type copper phthalocyanine, β-type copper phthalocyanine, γ-type copper phthalocyanine, ε-type copper phthalocyanine, X-type copper phthalocyanine, A-type titanyl phthalocyanine, B-type titanyl phthalocyanine, C-type titanyl phthalocyanine, D-type titanyl phthalocyanine, E-type titanyl phthalocyanine, F-type titanyl phthalocyanine, G-type titanyl phthalocyanine, H-type titanyl phthalocyanine, K-type titanyl phthalocyanine, L-type titanyl phthalocyanine, M-type titanyl phthalocyanine, N-type titanyl phthalocyanine, Y-type titanyl phthalocyanine, oxotitanyl phthalocyanine, titanyl phthalocyanine whose black angle 2 Ehas its diffraction peak at 27.3±0.2 degrees in a X-ray diffraction diagram, and gallium phthalocyanine; cyanine dye; anthracene pigment; bisazo pigment; pyrene pigment; polycyclic quinone pigment; quinacridone pigment; indigo pigment; perylene pigment; pyrylium dye; squarium pigment; anthoanthrone pigment; benzimidazole pigment; azo pigment; thioindigo pigment; quinoline pigment; lake pigment; oxazine pigment; dioxazine pigment; triphenylmethane pigment; azulenium dye; triarylmethane dye; xanthine dye; thiazine dye; thiapyrylium dye; polyvinyl carbazole; and bisbenzimidazole pigment. One of the above compounds may be singularly used, or two or more of them may be mixed for use as the charge generating material. Among the above charge generating materials, a compound disclosed in JP-A-11-172003 is preferable.

The charge transporting layer can be obtained as a wet molding by forming a layer in which the charge transporting material is bound onto the underlying substrate by a binder resin.

The binder resin for the charge generating layer and the charge transporting layer is not specifically limited. Various known resins are usable. Examples of such resins are polystyrene, polyvinyl chloride, polyvinyl acetate, vinyl chloride-vinyl acetate copolymer, polyvinyl acetal, alkyd resin, acrylic resin, polyacrylonitrile, polycarbonate, polyurethane, epoxy resin, phenol resin, polyamide, polyketone, polyacrylamide, butyral resin, polyester resin, vinylidene chloride-vinyl chloride copolymer, methacrylic resin, styrene-butadiene copolymer, vinylidene chloride-acrylonitrile copolymer, vinyl chloride-vinyl acetate-maleic anhydride copolymer, silicone resin, silicone-alkyd resin, phenol-formaldehyde resin, styrene-alkyd resin, melamine resin, polyether resin, benzoguanamine resin, epoxy-acrylate resin, urethane acrylate resin, poly-N-vinylcarbazole, polyvinyl butyral, polyvinyl formal, polysulphone, casein, gelatine, polyvinyl alcohol, ethyl cellulose, cellulose nitrate, carboxymethyl cellulose, vinylidene chloride-base polymer latex, acrylonitrile-butadiene copolymer, vinyl toluene-styrene copolymer, soybean oil-modified alkyd resin, nitrated polystyrene, polymethylstyrene, polyisoprene, polythiocarbonate, polyarylate, polyhaloarylate, polyallyl ether, polyvinyl acrylate and polyester acrylate.

One of the above resins may be singularly used, or two or more of them may be mixed for use. The binder resin used in the charge generating layer and the charge transporting layer is preferably the PC copolymer according to this exemplary embodiment.

While various known methods are usable for forming the charge transporting layer, the charge transporting layer is preferably obtained as a wet molding formed by applying a coating liquid in which both the charge transporting material and the copolymerized PC according to this exemplary embodiment are dispersed or dissolved in a suitable solvent onto a predetermined underlying substrate and drying the applied coating liquid. For forming the charge transporting layer, the charge transporting material and the PC resin are mixed together preferably by a mass ratio of 20:80 to 80:20, more preferably 30:70 to 70:30.

In the charge transporting layer, one type of the PC resin according to this exemplary embodiment may be singularly used, or two or more types thereof may be used together. As long as an object of the invention is not hampered, the charge transporting layer may also contain another binder resin in addition to the PC copolymer according to this exemplary embodiment.

The thickness of the charge transporting layer is typically approximately 5 to 100 μm, preferably 10 to 30 μm. When the thickness is less than 5 μm, the initial potential may be lowered. When the thickness is more than 100 μm, electrophotographic characteristics may be deteriorated.

Various known compounds are usable as the charge transporting material that is usable together with the PC resin according to this exemplary embodiment. Preferable examples of such compounds are carbazole compound, indole compound, imidazole compound, oxazole compound, pyrazole compound, oxadiazole compound, pyrazoline compound, thiadiazole compound, aniline compound, hydrazone compound, aromatic amine compound, aliphatic amine compound, stilbene compound, fluorenone compound, butadiene compound, enamine compound, quinone compound, quinodimethane compound, thiazole compound, triazole compound, imidazolone compound, imidazolidine compound, bisimidazolidine compound, oxazolone compound, benzothiazole compound, benzimidazole compound, quinazoline compound, benzofuran compound, acridine compound, phenazine compound, poly-N-vinylcarbazole, polyvinyl pyrene, polyvinyl anthracene, polyvinyl acridine, poly-9-vinyl phenyl anthracene, pyrene-formaldehyde resin, ethylcarbazole resin, and a polymer having the above structure in the main chain or side chain. One of the above compounds may be singularly used, or two or more of the above may be used together.

Among the above charge transporting materials, a compound disclosed in JP-A-11-172003 and a charge transporting substance represented by the following structures are particularly preferably usable. A compound represented by a formula (23) used in Example is also preferable.

[Formula 26]
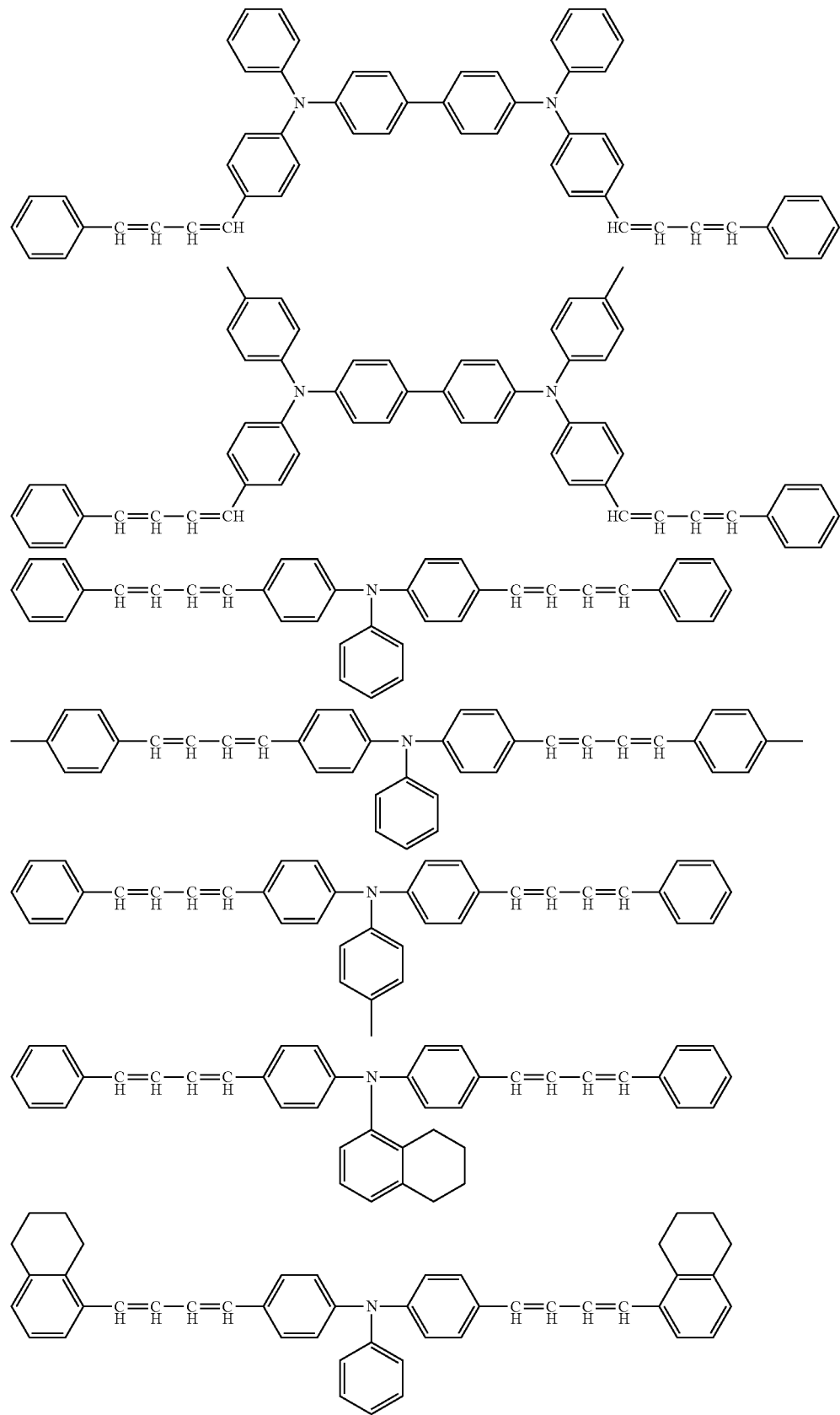

-continued
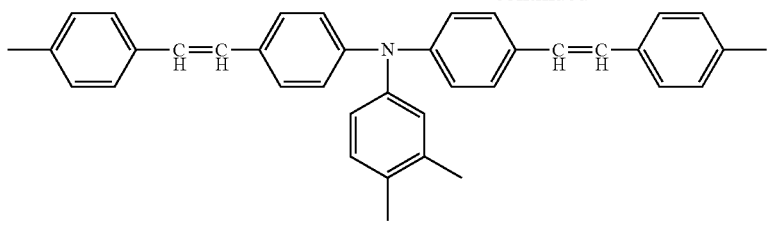
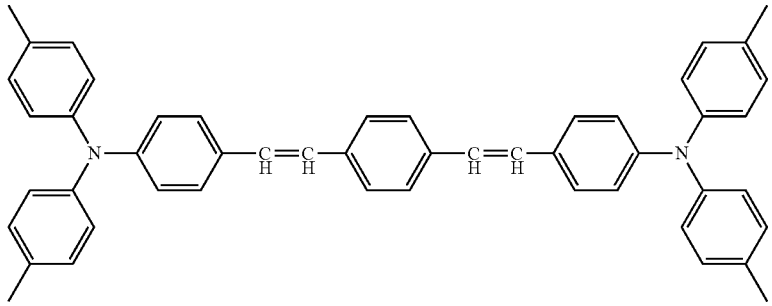
[Formula 27]
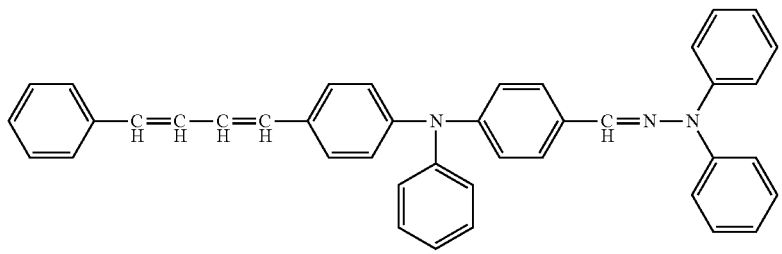
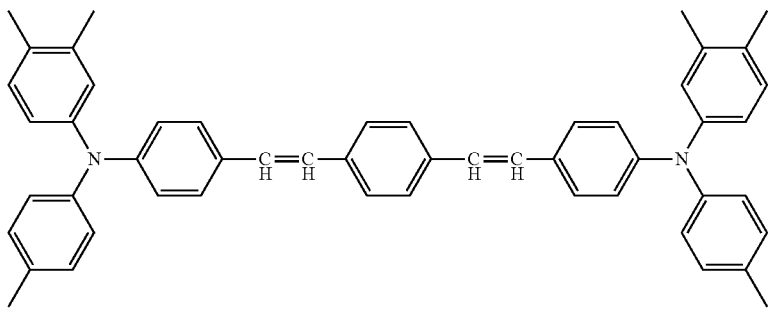
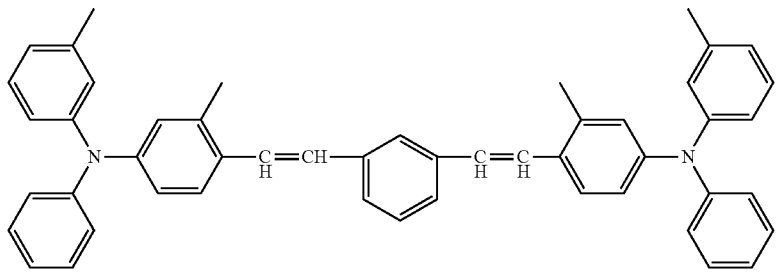
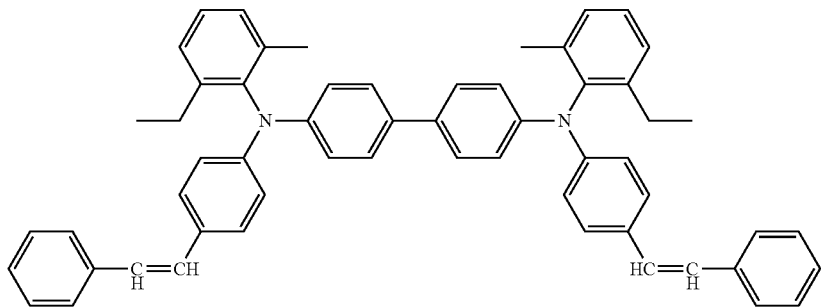

-continued
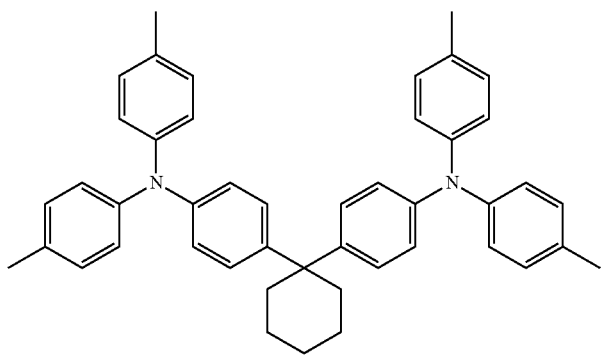
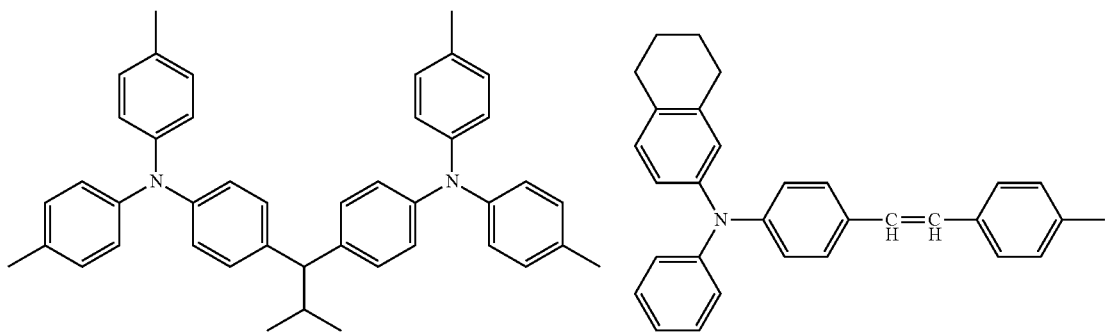
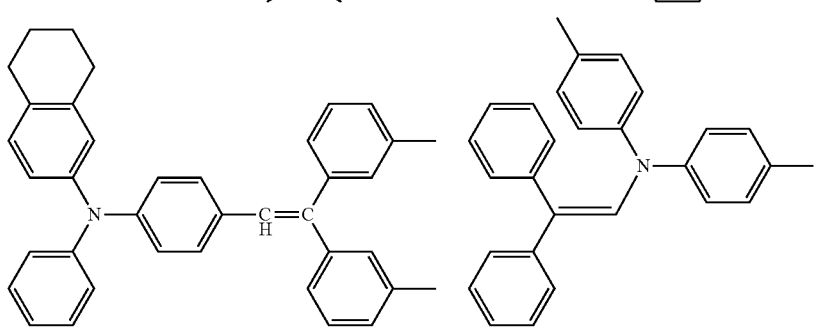
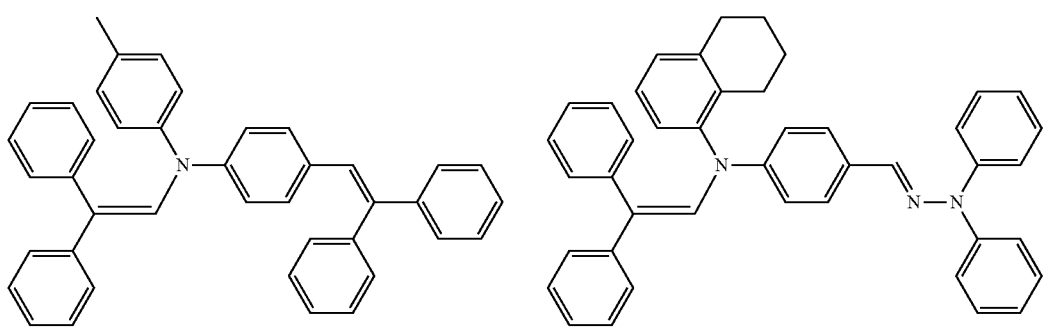
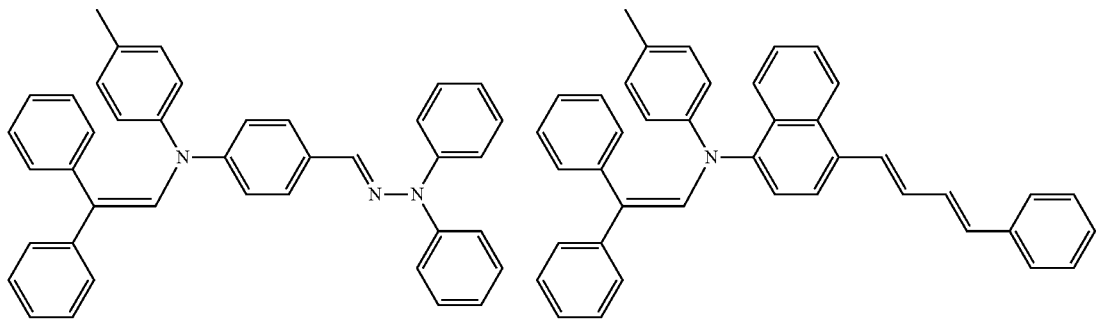

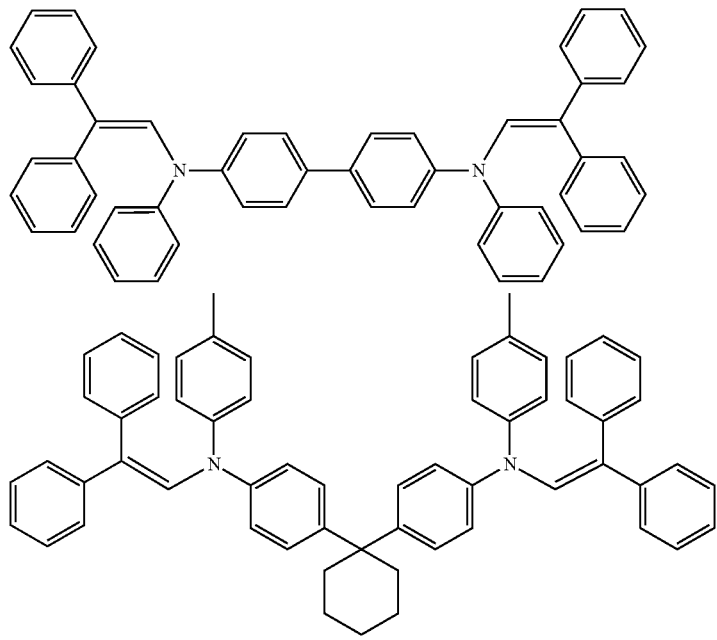
[Formula 28]
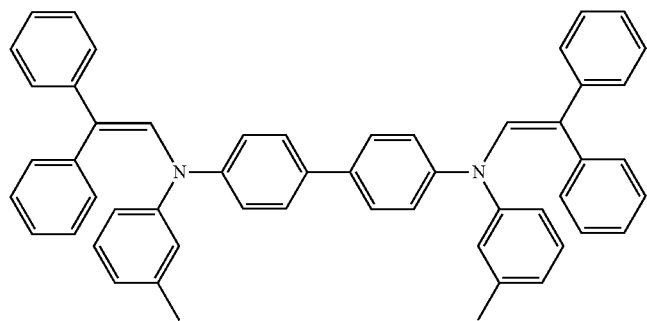
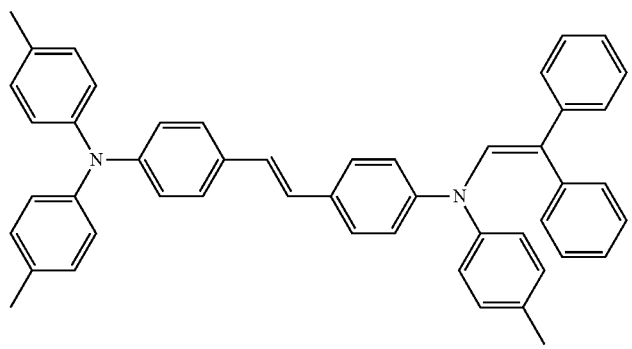
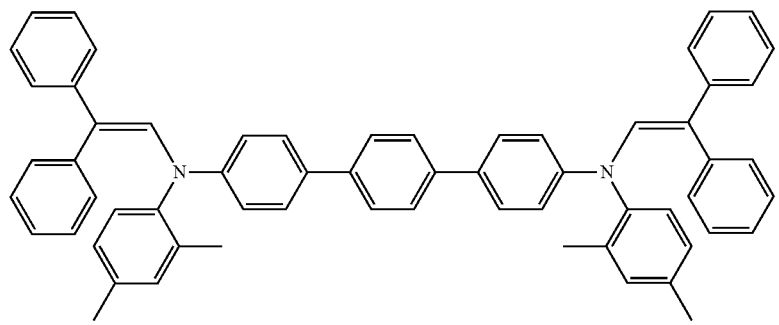

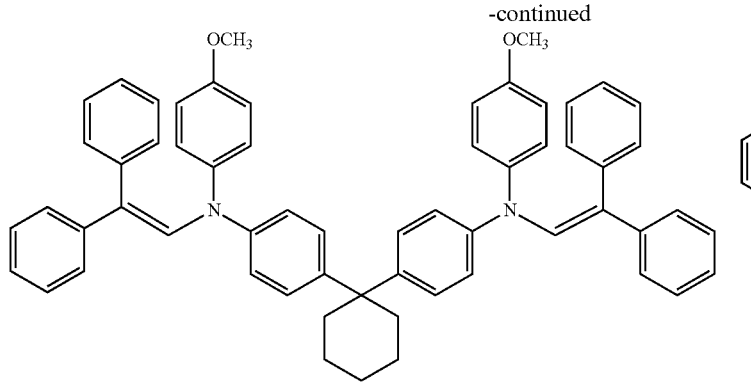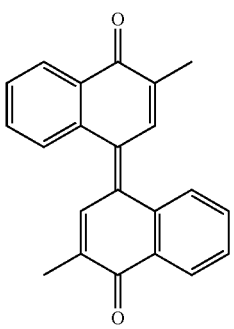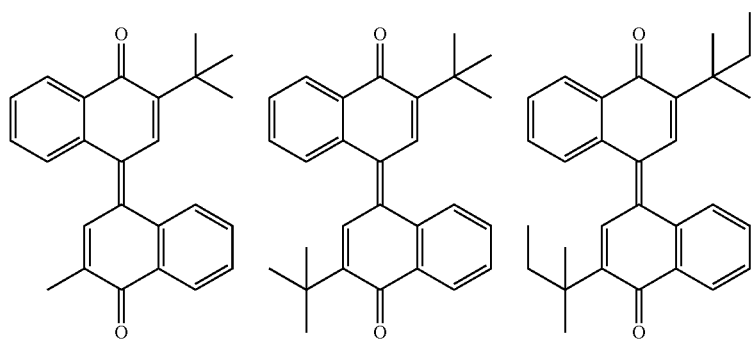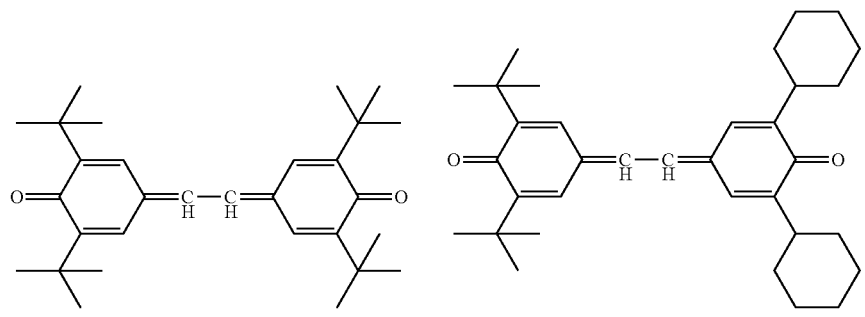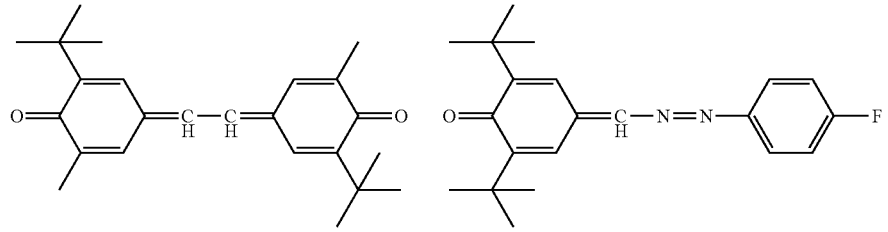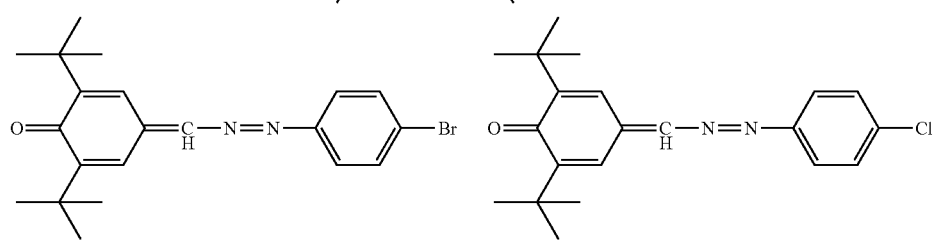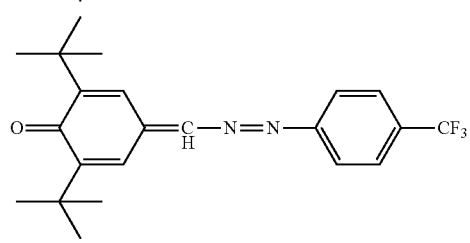

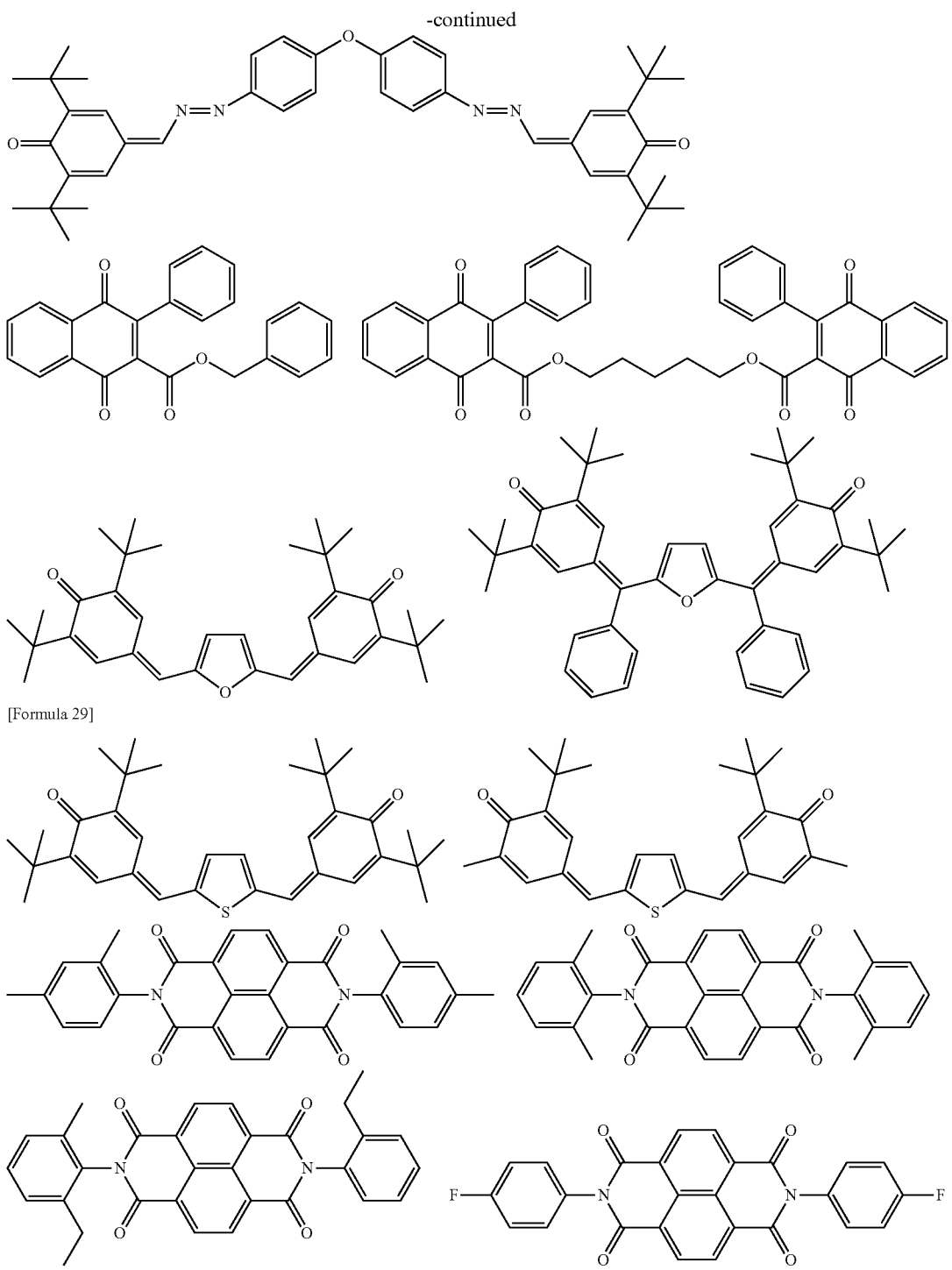

[Formula 29]

In the electrophotographic photoreceptor according to this exemplary embodiment, the PC copolymer according to this exemplary embodiment is preferably used as the binder resin in at least one of the charge generating layer and the charge transporting layer.

The electrophotographic photoreceptor according to this exemplary embodiment may be provided with a typically-used undercoat layer between the conductive substrate and the photosensitive layer. Examples of the undercoat layer are particles such as titanium oxide, aluminum oxide, zirconia, titanic acid, zirconic acid, lanthanum lead, titanium black, silica, lead titanate, barium titanate, tin oxide, indium oxide and silicon oxide, and components such as polyamide resin, phenol resin, casein, melamine resin, benzoguanamine resin, polyurethane resin, epoxy resin, cellulose, cellulose nitrate, polyvinyl alcohol and polyvinyl butyral resin. The resin usable for the undercoat layer may be the above binder resin or the PC resin according to this exemplary embodiment. One of the above particles and the resins may be singularly used or a variety thereof may be mixed together in use. When a mixture thereof is used, a combination of inorganic particles and a resin is preferable because a flat and smooth film can be made.

The thickness of the undercoat layer is typically approximately 0.01 to 10 μm, preferably 0.1 to 7 μm. When the thickness is less than 0.01 μm, it is difficult to form an even undercoat layer. On the other hand, when the thickness is more than 10 μm, electrophotographic characteristics may be deteriorated. The electrophotographic photoreceptor according to this exemplary embodiment may be provided with a typically-used known blocking layer between the conductive substrate and the photosensitive layer. The blocking layer may be made of the same resin as the binder resin. Alternatively, the blocking layer may be made of the polycarbonate resin according to this exemplary embodiment. The thickness of the blocking layer is typically 0.01 to 20 μm, preferably 0.1 to 10 μm. When the thickness is less than 0.01 μm, it is difficult to form an even blocking layer. On the other hand, when the thickness is more than 20 μm, electrophotographic characteristics may be deteriorated.

The electrophotographic photoreceptor according to this exemplary embodiment may be further provided with a protective layer laminated on the photosensitive layer. The protective layer may be made of the same resin as the binder resin. Alternatively, the protective layer may be made of the polycarbonate resin according to this exemplary embodiment. The thickness of the protective layer is typically 0.01 to 20 μm, preferably 0.1 to 10 μm. The protective layer may contain a conductive material such as the charge generating material, the charge transporting material, an additive, a metal, oxides thereof, nitrides thereof, salts thereof, alloy thereof, carbon black and an organic conductive compound.

In order to enhance performance of the electrophotographic photoreceptor, the charge generating layer and the charge transporting layer may be added with a binder, a plasticizer, a curing catalyst, a fluidity adder, a pinhole controller and a spectral-sensitivity sensitizer (sensitizer dye). In addition, in order to prevent increase in residual potential after repeated use, reduction in charged potential and deterioration of sensitivity, various chemical substances and additives such as antioxidant, surfactant, curl inhibitor and leveling agent may be added.

Examples of the binders are silicone resin, polyamide resin, polyurethane resin, polyester resin, epoxy resin, polyketone resin, polycarbonate resin, polystyrene resin, polymethacrylate resin, polyacrylamide resin, polybutadiene resin, polyisoprene resin, melamine resin, benzoguanamine resin, polychloroprene resin, polyacrylonitrile resin, ethyl cellulose resin, cellulose nitrate resin, urea resin, phenol resin, phenoxy resin, polyvinyl butyral resin, formal resin, vinyl acetate resin, vinyl acetate/vinyl chloride copolymer resin, and polyester carbonate resin. In addition, at least one of a thermoset resin and a light-curable resin is also usable. The binder is not specifically limited to the above, as long as the binder is an electric-insulating resin from which a film is formable under normal conditions, and as long as an advantage of the invention is not hampered.

Examples of the plasticizer are biphenyl, chlorinated biphenyl, o-terphenyl, halogenated paraffin, dimethylnaphthalene, dimethyl phthalate, dibutyl phthalate, dioctyl phthalate, diethylene glycol phthalate, triphenyl phosphate, diisobutyl adipate, dimethyl sebacate, dibutyl sebacate, laurate butyl, methylphthalyl ethyl glycolate, dimethyl glycol phthalate, methylnaphthalene, benzophenone, polypropylene, polystyrene, and fluorohydrocarbon.

Examples of the curing catalyst are methanesulfonic acid, dodecylbenzenesulfonic acid and dinonylnaphthalene disulfonic acid. Examples of the fluidity adder are Modaflow™ and Acronal 4F™. Examples of the pinhole controller are benzoin and dimethyl phthalate. The above plasticizer, curing catalyst, fluidity adder and pinhole controller are preferably contained at a content of 5 mass % or less of the charge transporting material.

When a sensitizer dye is used as a spectral-sensitivity sensitizer, suitable examples of the sensitizer dye are triphenylmethane-base dye such as methyl violet, crystal violet, night blue and Victria blue, acridine dye such as erythrosine, Rhodamine B, Rhodamine 3R, acridine orange and frapeosine, thiazine dye such as methylene blue and methylene green, oxazine dye such as capri blue and meldra blue, cyanine dye, merocyanine dye, styryl dye, pyrylium salt dye and thiopyrylium salt dye.

In order to enhance the sensitivity, reduce the residual potential and reduce fatigue due to repeated use, the photosensitive layer may be added with an electron-accepting material. Examples of the electron-accepting material are preferably compounds having high electron affinity such as succinic anhydride, maleic anhydride, dibromo maleic anhydride, phthalic anhydride, tetrachloro phthalic anhydride, tetrabromo phthalic anhydride, 3-nitro phthalic anhydride, 4-nitro phthalic anhydride, pyromellitic anhydride, mellitic anhydride, tetracyanoethylene, tetracyanoquinodimethane, o-dinitro benzene, m-dinitro benzene, 1,3,5-trinitro benzene, p-nitrobenzonitrile, picryl chloride, quinone chlorimide, chloranil, bromanil, benzoquinone, 2,3-dichloro benzoquinone, dichloro dicyano parabenzoquinone, naphthoquinone, diphenoquinone, tropoquinone, anthraquinone, 1-chloro anthraquinone, dinitro anthraquinone, 4-nitrobenzophenone, 4,4-dinitrobenzophenone, 4-nitrobenzal malonodinitrile, α-cyano-β-(p-cyanophenyl)ethyl acrylate, 9-anthracenyl methylmalonodinitrile, 1-cyano-(p-nitrophenyl)-2-(p-chlorophenyl)ethylene, 2,7-dinitro fluorenone, 2,4,7-trinitro fluorenone, 2,4,5,7-tetranitro fluorenone, 9-fluorenylidene-(dicyano methylene malononitrile), polynitro-9-fluorenylidene-(dicyano methylene malonodinitrile), picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid and mellitic acid. The above compounds may be added to either the charge generating layer or the charge transporting layer. An additive ratio of the compounds is 0.01 to 200 parts by mass per 100 parts by mass of the charge generating material or the charge transporting material, preferably 0.1 to 50 parts by mass. Further, in order to improve surface quality, tetrafluoroethylene resin, trifluoroethylene chloride resin, tetrafluoroethylene hexafluoropropylene resin, vinyl fluoride resin, vinylidene fluoride resin, difluoroethylene dichloride resin, copolymer(s) thereof, or fluorine-base graft polymer may be used. An additive ratio of such surface modifiers is 0.1 to 60 mass % of the binder resin, preferably 5 to 40 mass %. When the additive ratio is less than 0.1 mass %, surface modification such as enhancement of surface durability and reduction in surface energy may not be sufficient. When the additive ratio is more than 60 mass %, the electrophotographic characteristics may be deteriorated.

Examples of the antioxidant are preferably a hindered phenol-base antioxidant, aromatic amine-base antioxidant, hindered amine-base antioxidant, sulfide-base antioxidant and organophosphate-base antioxidant. An additive ratio of such antioxidants is typically 0.01 to 10 mass % of the charge transporting material, preferably 0.1 to 2 mass %.

Preferable examples of such antioxidants are compounds represented by chemical formulae disclosed in the Specification of JP-A-11-172003 ([Chemical Formula 94] to [Chemical Formula 101]).

One of the above antioxidants may be singularly used, or two or more of them may be mixed in use. In addition to the photosensitive layer, the above antioxidant may be added to the surface protecting layer, the undercoat layer and the blocking layer.

Examples of the solvent usable in forming the charge generating layer and the charge transporting layer are aromatic solvent such as benzene, toluene, xylene and chlorobenzene, ketone such as acetone, methyl ethyl ketone and cyclohexaneone, alcohol such as methanol, ethanol and isopropanol, ester such as acetic ether and ethyl cellosolve, halogenated hydrocarbon such as carbon tetrachloride, carbon tetrabromide, chloroform, dichloromethane and tetrachloroethane, ether such as tetrahydrofuran, dioxolane and dioxane, dimethylformamide, dimethylsulfoxide, and diethyl formamide. One of the above solvents may be singularly used, or two or more of them may be used together as a mixture solvent.

The photosensitive layer of a single-layer electrophotographic photoreceptor can be easily formed by applying the binder resin (PC copolymer) according to this exemplary embodiment with use of the charge generating material, the charge transporting material and the additive. The charge transporting material is preferably added with at least one of the above-described hole-transport material and an electron-transport material. Compounds disclosed in JP-A-2005-139339 can be preferably applied as the electron-transport material.

Various coating applicators (e.g., known applicators) can perform application of each layer. Examples of such a coating applicator are an applicator, a spray coater, a bar coater, a chip coater, a roll coater, a dip coater and a doctor blade.

The thickness of the photosensitive layer of the electrophotographic photoreceptor is 5 to 100 µm, preferably 8 to 50 µm. When the thickness is less than 5 µm, the initial potential tends to be low. When the thickness is more than 100 µm, electrophotographic characteristics may be deteriorated. In manufacturing the electrophotographic photoreceptor, a ratio of the charge generating material to the binder resin is 1:99 to 30:70 by mass, more preferably 3:97 to 15:85 by mass. However, favorable electrophotographic characteristics might be obtained with the ratio out of the above range. On the other hand, a ratio of the charge transporting material to the binder resin is 10:90 to 80:20 by mass, more preferably 30:70 to 70:30 by mass.

Since the electrophotographic photoreceptor according to this exemplary embodiment uses the PC copolymer according to this exemplary embodiment, a coating agent is not whitened (gelled) in manufacturing the photosensitive layer. In addition, since containing a molding (binder resin) molded of the copolymerized PC according to this exemplary embodiment in its photosensitive layer, the electrophotographic photoreceptor according to this exemplary embodiment has excellent durability (scratch resistance) and electrification characteristics. Thus, the photoreceptor according to this exemplary embodiment can maintain its excellent electrophotographic characteristics for a long time. Accordingly, the photoreceptor according to this exemplary embodiment is favorably applicable to various electrophotographic fields such as copier (black and white copier, multi-color copier, full-color copier; analog copier, digital copier), printer (laser printer, LED printer, liquid-crystal shutter printer), facsimile, platemaker and equipment capable of functioning as a plurality of them.

The electrophotographic photoreceptor according to this exemplary embodiment is electrified in use by corona discharge (corotron, scorotron), contact charging (charge roll, charge brush) or the like. Examples of the charge roll are a charge roll by DC electrification and a charge roll by AC and DC superimposed electrification. For exposure, a halogen lamp, a fluorescent lamp, laser (semiconductor, He—Ne), LED or a photoreceptor internal exposure system may be used. For image development, dry developing such as cascade developing, two-component magnetic brush developing, one-component insulating toner developing and one-component conductive toner developing, and wet developing may be used. For transfer, electrostatic transfer such as corona transfer, roller transfer and belt transfer, pressure transfer and adhesive transfer may be used. For fixing, heat roller fixing, radiant flash fixing, open fixing, pressure fixing and the like may be used. For cleaning and neutralizing, brush cleaner, magnetic brush cleaner, electrostatic brush cleaner, magnetic roller cleaner, blade cleaner and those in which cleaner is omitted may be used. Examples of a resin for toner are styrene-base resin, styrene-acrylic base copolymer resin, polyester, epoxy resin and cyclic hydrocarbon polymer. The toner may be spherical or amorphous. The toner may also be controlled to have a certain shape (such as spheroidal shape and potato shape). The toner may be pulverized toner, suspension-polymerized toner, emulsion-polymerized toner, chemically-pelletized toner, or ester-elongation toner.

EXAMPLES

Next, the invention will be described in detail with reference to Examples and Comparatives. However, the invention is not limited to the examples but may include various modifications and applications as long as such modifications and applications do not depart from a technical idea of the invention.

Manufacturing Example

Preparation of Oligomer

Manufacturing Example 1

Synthesis of 4,4'-biphenol Oligomer (Bischloroformate)

50.0 g (0.269 mol) of 4,4'-biphenol, 500 ml of methylene chloride and 80.0 g (0.809 mol) of phosgene were mixed into a solution. To the mixed solution, a solution prepared by diluting 59.8 g (0.591 mol) of triethylamine in 100 ml of methylene chloride was dropped at 13 to 16 degrees C. for three hours and six minutes. The reactant mixture was stirred at 14 to 16 degrees C. for one hour and 38 minutes. 5.0 ml of concentrated hydrochloric acid and 200 ml of deionized water were added to the reactant mixture for cleaning. Subsequently, water cleaning was repeated until an aqueous layer became neutral. The resultant methylene chloride solution was a bischloroformate compound-containing solution (897.5 g).

The obtained solution had a chloroformate concentration of 0.83 mol/L, a solid concentration of 0.13 kg/L and an average number of monomer units of 1.00. This obtained ingredient will be referred to as "BP-CF 1" hereinafter.

The average number of repeating units (n') was obtained using the following formula.

$$\text{average number of monomer units } (n') = 1 + (Mav - M1)/M2 \quad \text{(Numerical Formula 2)}$$

In the numerical formula 2, Mav represents (2×1000/(CF value), M2 represents (M1−98.92), and M1 represents a molecular weight of the bischloroformate compound when n'=1 in the formula (5). The CF value (N/kg) represents (CF value/concentration). The CF value (N) represents the number of chlorine molecule in the bischloroformate compound represented by the formula (5) contained in 1 L of the reaction solution. The concentration (kg/L) represents an amount of the solid content obtained by concentrating the 1-L reaction solution. Herein, 98.92 is a total atom weight of two chlorine atoms, one oxygen atom and one carbon atom which are desorbed at polycondensation of the bischloroformate compounds.

Manufacturing Example 2

Synthesis of 4,4'-biphenol Oligomer (Bischloroformate)

50.0 g (0.269 mol) of 4,4'-biphenol, 500 ml of methylene chloride and 54.5 g (0.551 mol) of phosgene were mixed into a solution. To the mixed solution, a solution prepared by diluting 59.8 g (0.591 mol) of triethylamine in 100 ml of methylene chloride was dropped at 13 to 16 degrees C. for one hours and 36 minutes. The reactant mixture was stirred at 14 to 16 degrees C. for one hour and 38 minutes. 5.0 ml of concentrated hydrochloric acid and 200 ml of deionized water were added to the reactant mixture for cleaning. Subsequently, water cleaning was repeated until an aqueous layer became neutral. The resultant methylene chloride solution was a bischloroformate compound-containing solution (880.2 g).

The solution had a chloroformate concentration of 0.91 mol/L, a solid concentration of 0.20 kg/L and an average number of repeating units of 1.61. This obtained ingredient will be referred to as "BP-$CF_2$" hereinafter.

Manufacturing Example 3

Synthesis of 3,3'-dimethyl-4,4'-dihydroxy-biphenyl Oligomer (Bischloroformate)

57.7 g (0.269 mol) of 3,3'-dimethyl-4,4'-dihydroxy-biphenyl, 500 ml of methylene chloride and 80.0 g (0.809 mol) of phosgene were mixed into a solution. To the mixed solution, a solution prepared by diluting 59.8 g (0.591 mol) of triethylamine in 100 ml of methylene chloride was dropped at 13 to 16 degrees C. for three hours and six minutes. The reactant mixture was stirred at 14 to 16 degrees C. for one hour and 38 minutes. 5.0 ml of concentrated hydrochloric acid and 200 ml of deionized water were added to the reactant mixture for cleaning. Subsequently, water cleaning was repeated until an aqueous layer became neutral. The resultant methylene chloride solution was a bischloroformate compound-containing solution (910.2 g).

The obtained solution had a chloroformate concentration of 0.82 mol/L, a solid concentration of 0.145 kg/L and an average number of monomer units of 1.09. This obtained ingredient will be referred to as "DMBP-CF" hereinafter.

Manufacturing Example 4

Synthesis of Bisphenol Z Oligomer (Bischloroformate)

73.0 g (0.272 mol) of 1,1-bis(4-hydroxyphenyl)cyclohexane (bisphenol Z) was suspended in 410 mL of methylene chloride, to which 55.3 g (0.546 mol) of triethylamine was added for dissolution. The obtained solution was dropped into a solution, which was prepared by dissolving 54.5 g (0.551 mol) of phosgene in 225 mL of methylene chloride, at 14 to 18.5 degrees C. for 2 hours and 50 minutes. After stirring at 18.5 to 19 degrees C. for one hour, 250 mL of methylene chloride was distilled away at 10 to 22 degrees C. 73 mL of deionized water, 4.5 mL of concentrated hydrochloric acid and 0.47 g of hydrosulphite were added to the residual solution for cleaning. Subsequently, cleaning with 330 mL of deionized water was repeated four times. A methylene chloride solution of a bisphenol Z oligomer having a chloroformate group at its molecular terminal was obtained. The obtained solution had a chloroformate concentration of 0.91 mol/L, a solid concentration of 0.22 kg/L and an average number of monomer units of 1.31. This obtained ingredient will be referred to as "Z-CF" hereinafter.

Example 1

Manufacturing of PC Copolymer

BF—CF1 (18 mL) of Manufacturing Example 1 and methylene chloride (16 mL) were injected to a reactor with a mechanical stirrer, stirring vane and baffle plate. To the reactor, p-tert-butylphenol (hereinafter referred to as PTBP) (0.039 g) as a terminal terminator was added and stirred for sufficient mixing. A bisphenol Z monomer solution was separately prepared by a bisphenol-Z-monomer solution preparation method including: preparing 11 mL of 1.8N potassium hydroxide aqueous solution (1.24 g of potassium hydroxide with purity of 86%); cooling the solution at the room temperature or less; adding 0.1 g of hydrosulphite and 2.0 g of bisphenol Z as an antioxidant; and completely dissolving the mixed solution. All amount of the bisphenol Z monomer solution prepared as described above was added to the PTBP solution. After the reactor was cooled down to 15 degrees C. of its inner temperature, 0.1 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.03N hydrochloric acid one time, and with 0.1 L of water three times in this order. The obtained methylene chloride solution was dropped into methanol with stirring. The obtained redeposit was filtered and dried to prepare a PC copolymer (PC-1) with the following structure.

Calculation of Acid Binding Value

An acid binding value was calculated according to the aforementioned calculation formula (Numerical Formula 1).

The following values were respectively assigned to a mole number Mc (mol) of the bischloroformate oligomer, a mole number Mp (mol) of the divalent phenol monomer, a mole number Mo (mol) of the acid binding agent, and a valence Y of the acid binding agent.

Mo=(1.24×0.86)/56=0.019 mol
Y=1
2Mc=0.83×0.018×2=0.030 mol
2Mp=(2.0/268)×2=0.015 mol
X=0.019×1/(0.030−0.015)=1.26

Identification of PC Copolymer

Then, the PC copolymer (PC-1) thus obtained was dissolved in methylene chloride to prepare a solution having a concentration of 0.5 g/dl. When reduced viscosity [$\eta_{sp}$/C] thereof at 20 degrees C. was measured, the result was 1.13 dl/g. A structure and a composition of the obtained PC-1 were analyzed by $^1$H-NMR spectrum method and $^{13}$C-NMR spectrum method. The obtained PC-1 was identified as a PC copolymer having a repeating unit, the number of the repeating unit and a composition as follows. A ratio R of the hydroxyl group at all the ends of PC-1 was calculated from $^1$H-NMR spectrum according to the following calculation formula (Numerical Formula 3) based on an integral value Iend derived from the terminal terminator, the number of proton Hend derived from the terminal terminator, an integral value Ioh derived from the aromatic hydroxyl group at the ends of the PC copolymer and the number of proton Hoh derived from the aromatic hydroxyl group at the ends of the PC copolymer. The ratio of the hydroxyl group at all the end of PC-1 was 6 mol %.

$$R = (Ioh/Hoh)/(Iend/Hend + Ioh/Hos) \quad \text{(Numerical Formula 3)}$$

[Formula 30]

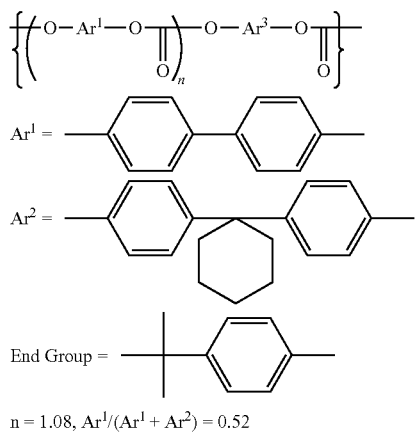

n = 1.08, $Ar^1/(Ar^1 + Ar^2) = 0.52$

A structure of the PC copolymer in the formula (100) was identified according to the following procedure. Firstly, a copolymerization ratio of each of $Ar^1$ and $Ar^2$ was calculated from the $^1$H-NMR spectrum. Next, it was confirmed using $^{13}$C-NMR spectrum that $Ar^2$ was not bonded to another $Ar^2$. Subsequently, an average number of monomer units n of $Ar^1$ was calculated according to the following calculation formula (Numerical Formula 4).

$$Ar^1/(Ar^1+Ar^2)=n/(n+1) \quad \text{(Numerical Formula 4)}$$

Manufacturing of Coating Liquid and Electrophotographic Photoreceptor

A film of polyethylene terephthalate resin on which aluminum metal was deposited was used as a conductive substrate. A charge generating layer and a charge transporting layer were sequentially laminated on the surface of the conductive substrate to form a laminate sensitive layer, thereby providing an electrophotographic photoreceptor. 0.5 parts by mass of oxotitanium phthalocyanine was used as a charge generating material while 0.5 parts by mass of a butyral resin was used as a binder resin. The charge generating material and the binder resin were added into 19 parts by mass of methylene chloride (solvent) and dispersed with a ball mill. Then, the dispersion was applied onto the surface of the conductive-substrate film and dried, thereby providing a charge generating layer having a film thickness of approximately 0.5 μm.

Next, for use as a charge transporting material, 0.5 g of a compound (CTM-1) represented by the following formula (23) and 0.5 g of the obtained polycarbonate copolymer (PC-1) were dispersed in 10 ml of tetrahydrofuran to prepare a coating liquid. The coating liquid was applied onto the charge generating layer with an applicator and dried, thereby providing a charge transporting layer having a film thickness of approximately 20 μm.

[Formula 31]

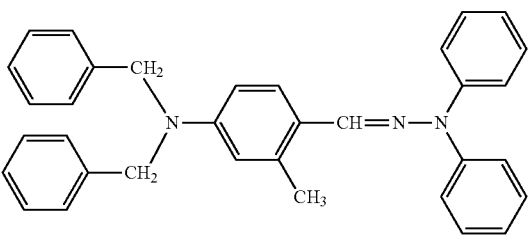

Evaluation of PC Copolymer and Electrophotographic Photoreceptor

Solubility of the PC copolymer was evaluated by visually checking whitening degree of the prepared coating liquid when the coating liquid was prepared. A case where the PC copolymer was dissolved to show no whitening was marked as A, a case where the PC copolymer was partially undissolved was marked as B, and a case where the PC copolymer was whitened was marked as C.

Wear resistance of the PC copolymer and the electrophotographic photoreceptor was evaluated as follows.

(1) Sample preparation for evaluation on wear resistance of the copolymer: PC-1 (2 g) was dissolved in methylene chloride (12 mL) and the obtained solution was cast into film on a commercially available PET film using an applicator. This film was heated under reduced pressure and a solvent was removed to obtain a film sample having a thickness of about 30 μm.

(2) Sample preparation for evaluation on wear resistance of the photoreceptor: PC-1 (1 g) and CTM-1 (1 g) were dissolved in methylene chloride (10 mL) and the obtained solution was cast into film on a commercially available PET film using an applicator. This film was heated under reduced pressure and a solvent was removed to obtain a film sample having a thickness of about 30 μm.

(3) Evaluation: wear resistance of cast surfaces of the films manufactured at (1) and (2) process was evaluated using a Suga wear test instrument NUS-ISO-3 model (manufactured by Suga Test Instruments Co., Ltd.). Testing conditions: An abrasion paper having an alumina particle with a particle size of 3 μm was given a 4.9-N load. The sample was put into reciprocating motion 2000 times on the abrasion paper in contact with a surface of a photosensitive layer. A mass reduction of the sample was measured. The mass reduction of the film sample manufactured at the (2) process was evaluated as wear resistance of the electrophotographic photoreceptor.

Next, electrophotographic characteristics of the obtained electrophotographic photoreceptor were measured using an electrostatic charge tester EPA-8100 (manufactured by Kawaguchi Electric Works Co., Ltd.). Specifically, corona discharge of −6 kV was conducted in the static mode. Then, a residual potential (initial residual potential (VR)) after five seconds of light irradiation (10 Lux) was measured. Further, a commercially available printer (FS-600, manufactured by Kyocera Corporation) was modified, which enabled to measure the surface potential of the photoreceptor. Then, the photoreceptor was mounted on a drum and evaluated in terms of electrification characteristics (repeating residual-potential increase (VR increase) before and after 24-hour-consecutive operation under conditions of high temperature and high humidity (35 degrees C., 85%) not through a toner and a paper.

The results are shown in Table 1. The following Examples 2 to 6 and Comparatives 1 to 3 were evaluated in the same manner. The results are also shown in Table 1.

Example 2

A PC copolymer (PC-2) was manufactured in the same manner as in Example 1 except that the bischloroformate oligomer was replaced by BP-CF2 (18 mL) of Manufacturing Example 2, the amount of bisphenol Z was changed to 1.95 g and the amount of methylene chloride was changed to 33 mL. The value of the acid binding agent was 1.16.

The PC copolymer (PC-2) was identified as a PC copolymer having 1.10 dl/g of a reduced viscosity [ηsp/C] and a structure with the following repeating unit and composition in the formula (100). The ratio of the hydroxyl group at all the end of PC-2 was 7 mol %.

[Formula 32]

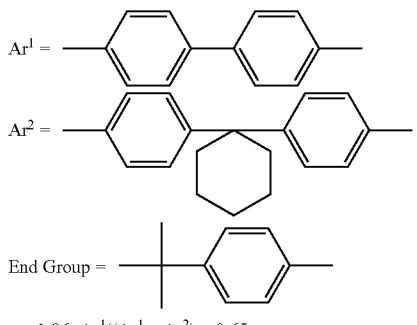

n = 1.86, $Ar^1/(Ar^1 + Ar^2) = 0.65$

Example 3

In Example 1, BP-CF1 (17 mL) and Z-CF (2 mL) of Manufacturing Example 4 were used together and the amount of methylene chloride was changed to 20 mL. Except for the above, a PC copolymer (PC-3) was manufactured in the same manner as in Example 2. The acid binding value was 1.28.

The PC copolymer (PC-3) was identified as a PC copolymer having 1.13 dl/g of a reduced viscosity [ηsp/C] and a structure with the following repeating unit and composition in the formula (1). The ratio of the hydroxyl group at all the end of PC-3 was 7 mol %.

[Formula 33]

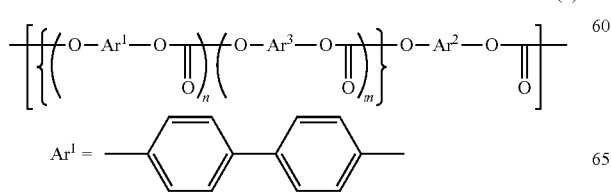

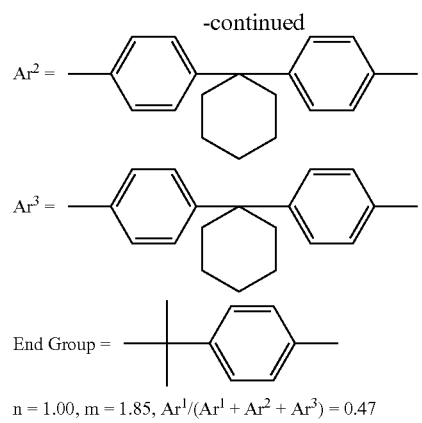

n = 1.00, m = 1.85, $Ar^1/(Ar^1 + Ar^2 + Ar^3) = 0.47$

In this Example, a structure of the PC copolymer in the formula (1) was identified according to the following procedure. Firstly, a copolymerization ratio of $Ar^1$ was calculated from the $^1$H-NMR spectrum. Since $Ar^2$ and $Ar^3$ have the same skeleton, a copolymerization ratio of each of those cannot be calculated. Next, it was confirmed using $^{13}$C-NMR spectrum that $Ar^1$ was not bonded to another $Ar^1$ and $Ar^1$ was formed of 1.00 monomer unit.

In order to obtain the average number of the monomer units m of $Ar^3$, firstly, an average number of monomer units m' of $Ar^2$ and $Ar^3$ was calculated according the calculation formula (Numerical Formula 5) since $Ar^2$ and $Ar^3$ have the same skeleton.

$Ar^1/\{Ar^1+(Ar^2+Ar^3)\}=1/(1+m')$ $Ar^1/\{Ar^1+(Ar^2+Ar^3)\}=1/(1+m')=0.47$ $m'=0.53/0.47=1.12$ (Numerical Formula 5)

Further, the average number of the monomer units m of $Ar^3$ was calculated according to the following formula.

$m'$=(mole number of $Ar^2$×average number of monomer units of $Ar^2$)+mole number of $Ar^3$×m/(mole number of $Ar^2$+mole number of $Ar^3$)

In the above formula, when the mole number of $Ar^2$ was set at 0.074, the mole number of $Ar^3$ was set at 0.012, and the average number of the monomer units of $Ar^2$ was set at 1.0 since $Ar^2$ was derived from a monomer, the average number of the monomer units m of $Ar^3$ was 1.85

Example 4

A PC copolymer (PC-4) was manufactured in the same manner as in Example 1 except that the monomer material was replaced by 1.49 g of 4,4'-dihydroxydiphenyl ether. The acid binding value was 1.30.

The PC copolymer (PC-4) was identified as a PC copolymer having 1.10 dl/g of a reduced viscosity [ηsp/C] and a structure with the following repeating unit and composition in the formula (100). The ratio of the hydroxyl group at all the end of PC-4 was 4 mol %.

[Formula 34]

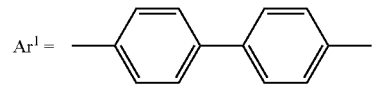

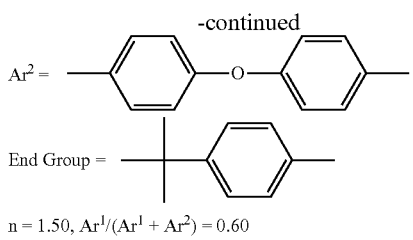

n = 1.50, Ar¹/(Ar¹ + Ar²) = 0.60

Example 5

A PC copolymer (PC-5) was manufactured in the same manner as in Example 1 except that the bischloroformate oligomer was replaced by DMBP-CF (18 mL) of Manufacturing Example 3, and the amount of 1.8N potassium hydroxide aqueous solution was changed to 10 ml (1.20 g of potassium hydroxide). The acid binding value was 1.28.

The PC copolymer (PC-5) was identified as a PC copolymer having 1.15 dl/g of a reduced viscosity [ηsp/C] and a structure with the following repeating unit and composition in the formula (100). The ratio of the hydroxyl group at all the end of PC-5 was 6 mol %.

[Formula 35]

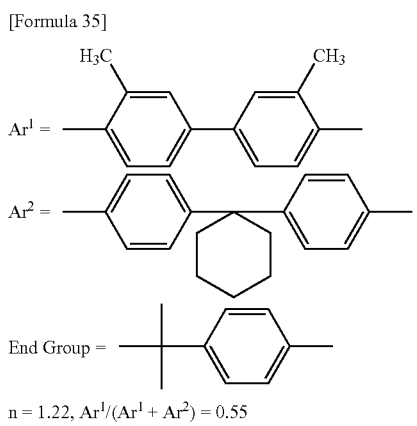

n = 1.22, Ar¹/(Ar¹ + Ar²) = 0.55

Example 6

BP-CF1 (20 mL) of Manufacturing Example 1 and methylene chloride (22 mL) were injected to a reactor with a mechanical stirrer, stirring vane and baffle plate. To this solution, PTBP (0.04 g) and 0.11 g of an organic siloxane modified phenol compound represented by the following formula 24 were added as a terminal terminator and stirred for sufficient mixing.

A bisphenol Z monomer solution was separately prepared by a bisphenol-Z-monomer solution preparation method including: preparing 10 mL of 2N aqueous sodium hydroxide; cooling the solution at the room temperature or less; adding 0.1 g of hydrosulphite and 2.0 g of bisphenol as an antioxidant; and completely dissolving the mixed solution. All amount of the bisphenol Z monomer solution prepared as described above was added to the PTBP solution. After the reactor was cooled down to 15 degrees C. of its inner temperature, 0.2 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water one time, with 0.1 L of 0.03N hydrochloric acid one time, and with 0.1 L of water five times in this order. The obtained methylene chloride solution was dropped into warm water with stirring. While evaporating methylene chloride, a solid content of a resin was obtained. The obtained deposit was filtered and dried to prepare a PC copolymer (PC-6) with the following structure. The acid binding value was 1.26.

A mass ratio of an organic siloxane modified phenylene group in the PC copolymer (PC-6) is 3 mass % based on a total mass of the PC copolymer. n2=39 is given in the following formula (24).

[Formula 36]

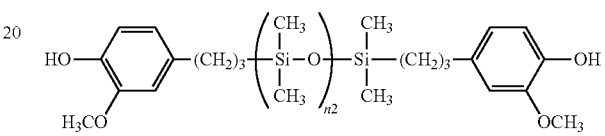

(24)

The PC copolymer (PC-6) was identified as a PC copolymer having 1.16 dl/g of a reduced viscosity [ηsp/C] and a structure with the following repeating unit and composition in the formula (100). The ratio of the hydroxyl group at all the end of PC-6 was 8 mol %.

[Formula 37]

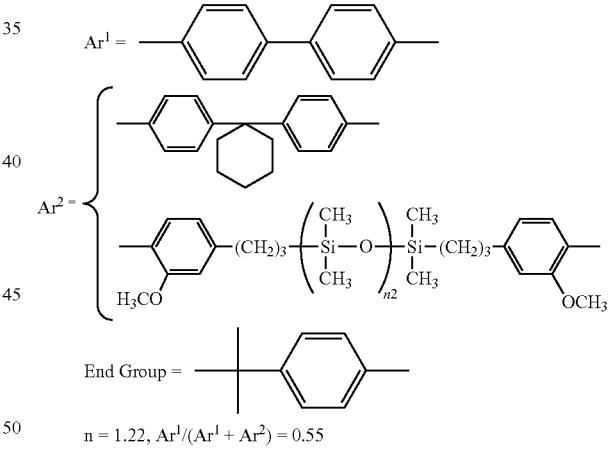

n = 1.22, Ar¹/(Ar¹ + Ar²) = 0.55

Comparative 1

A PC copolymer (PC-7) was manufactured in the same manner as in Example 2 except that the amount of bisphenol Z was changed to 1.7 g and the amount of 1.8N potassium hydroxide aqueous solution was changed to 14 ml (1.63 g of potassium hydroxide). The acid binding value was 1.29.

A reduced viscosity [ηsp/C] of PC-7 was 0.40 dl/g and a methylene chloride solution thereof was whitened due to crystallization of the PC copolymer. The PC copolymer (PC-7) was identified as a PC copolymer having a structure with the following repeating unit and composition in the formula (100). The ratio of the hydroxyl group at all the end of PC-7 was 6 mol %.

[Formula 38]

Ar¹ = 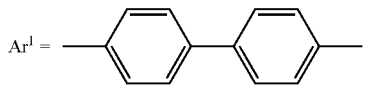

Ar² = 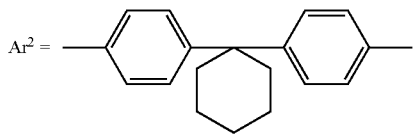

End Group = 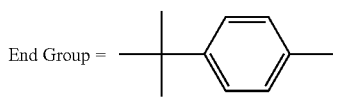

n = 3.54, Ar¹/(Ar¹ + Ar²) = 0.75

[Formula 39]

Ar¹ = 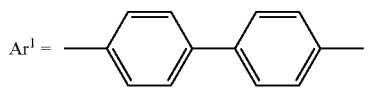

Ar² = 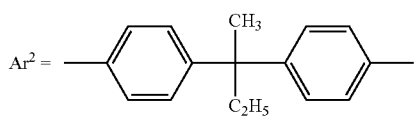

End Group = 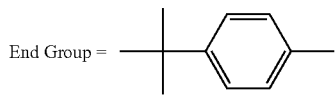

n = 1.50, Ar¹/(Ar¹ + Ar²) = 0.60

Comparative 2

According to the manufacturing method of Example 6 of International Publication No. WO2010-150885, a PC copolymer (PC-8) having 4,4'-biphenol at a ratio of 60% was manufactured as follows. An acid-binding value of 0.80 was used in the same manner as in Example 6 of International Publication No. WO2010-150885.

BP-CF1 (60 mL) of Manufacturing Example 1 was injected to a reactor with a mechanical stirrer, stirring vane and baffle plate. To this solution, PTBP (0.0332 g) was added as a terminal terminator and stirred for sufficient mixing. A monomer solution was separately prepared by a monomer-solution preparation method including: preparing 30 mL of 2N potassium hydroxide aqueous solution; cooling the solution at the room temperature or less; adding 0.1 g of hydrosulphite and 3.1 g of 2.2'-bis(4-hydroxyphenyl)butane as an antioxidant; and completely dissolving the mixed solution. All amount of the monomer solution prepared as described above was added to the PTBP solution. After the reactor was cooled down to 15 degrees C. of its inner temperature, 0.2 mL of a triethylamine aqueous solution (7 vol %) was added with stirring and kept on stirring for one hour.

The obtained reaction mixture was diluted with 0.2 L of methylene chloride and 0.1 L of water and cleaned. A lower layer was separated from the reaction mixture. Then, the reaction mixture was cleaned with 0.1 L of water twice, with 0.1 L of 0.03N hydrochloric acid one time, and with 0.1 L of water three times in this order. The obtained methylene chloride solution was dropped into methanol with stirring. The obtained redeposit was filtered and dried to prepare a PC copolymer (PC-8) with the following structure.

The PC copolymer (PC-8) was identified as a PC copolymer having 0.50 dl/g of a reduced viscosity [ηsp/C] and a structure with the following repeating unit and composition in the formula (100). The ratio of the hydroxyl group at all the end of PC-8 was 32 mol %.

The obtained PC-8 exhibited a low and variant polymerization stability. Accordingly, after the PC-8 was repeatedly manufactured and measurement results of each of the obtained PC copolymers (PC-8) were averaged, the obtained average was evaluated.

Comparative 3

A PC copolymer (PC-9) was manufactured in the same manner as in Comparative 2 by the manufacturing method described in Example 6 of International Publication No. WO2010-150885 except that 2.8 g of 2,2-bis(4-hydroxyphenyl)butane was replaced by 2.2 g of 4,4'-biphenol at the same equivalent. An acid-binding value of 0.80 was used in the same manner as in Example 6 of International Publication No. WO2010-150885.

The PC copolymer (PC-9) was identified as a PC copolymer having 0.21 dl/g of a reduced viscosity [ηsp/C] and a structure with the following repeating unit and composition in the formula (100). The ratio of the hydroxyl group at all the end of PC-9 was 35 mol %.

The obtained PC-9 exhibited a low and variant polymerization stability. Accordingly, after the PC-9 was repeatedly manufactured and measurement results of each of the obtained PC copolymers (PC-9) were averaged, the obtained average was evaluated.

[Formula 40]

Ar¹ = 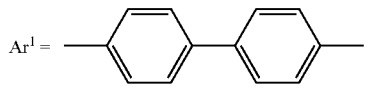

Ar¹ = 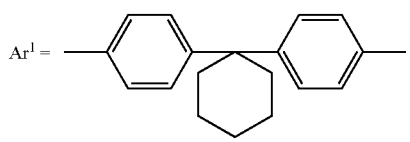

End Group = 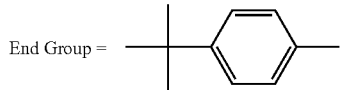

n = 1.50, Ar¹/(Ar¹ + Ar²) = 0.60

TABLE 1

| | PC Copolymer | | | | Electrophotographic Photoreceptor | | |
|---|---|---|---|---|---|---|---|
| | Reduced Viscosity (dl/g) | Wear Resistance (mg) | Solubility | OH ends/all ends (mol %) | Wear Resistance (mg) | Initial Residual Potential ($V_R$) | Repeating Residual Potential ($V_R$ Increase) |
| Example 1 (PC-1) | 1.13 | 0.21 | A | 6 | 0.5 | −10 | 10 |
| Example 2 (PC-2) | 1.10 | 0.18 | A | 7 | 0.4 | −10 | 10 |
| Example 3 (PC-3) | 1.13 | 0.28 | A | 7 | 0.5 | −10 | 10 |
| Example 4 (PC-4) | 1.10 | 0.18 | A | 4 | 0.5 | −10 | 10 |
| Example 5 (PC-5) | 1.15 | 0.25 | A | 6 | 0.5 | −10 | 10 |
| Example 6 (PC-6) | 1.16 | 0.19 | A | 8 | 0.4 | −10 | 10 |
| Comparative 1 (PC-7) | 0.40 | 0.68 | C | 6 | 1.9 | −100 | 100 |
| Comparative 2 (PC-8) | 0.50 | 0.65 | A | 32 | 2.2 | −35 | 35 |
| Comparative 3 (PC-9) | 0.21 | 0.82 | A | 35 | 3.1 | −35 | 35 |

Evaluation Results

Table 1 shows evaluation results of Examples 1 to 6 and Comparatives 1 to 3. In comparison between Examples 1 to 6 and Comparatives 1 to 3, the PC copolymers of Examples 1 to 6 were found to have a small mass reduction and an extremely excellent wear resistance in the wear resistance evaluation since the PC copolymers of Examples 1 to 6 exhibited a favorable reduced viscosity, a stable solubility to the organic solvent and an extremely small ratio of OH ends in all the ends. Moreover, the electrophotographic photoreceptors of Examples 1 to 6 were found excellent in all of wear resistance, electrical characteristics and electrification characteristics because the initial residual potential ($V_R$) and the repeating residual potential (increase in $V_R$) were small.

On the other hand, in Comparative 1, the PC copolymer exhibited a low reduced viscosity and a poor solubility due to crystallization of the PC copolymer, and the electrophotographic photoreceptor exhibited poor wear resistance, electrical characteristics and electrification characteristics because the mass reduction in the wear resistance evaluation was large and both of the initial residual potential and the repeating residual potential were large.

In Comparatives 2 and 3, since the PC copolymers exhibited a large ratio of OH ends in all the ends, it was found that the electrophotographic photoreceptor had poor wear resistance, electrical characteristics and electrification characteristics because the mass reduction in the wear resistance evaluation was large and both of the initial residual potential and the repeating residual potential were large.

Industrial Applicability

A polycarbonate copolymer according to the invention is favorably applicable to a binder resin for a photosensitive layer of an electrophotographic photoreceptor.

The invention claimed is:

1. A polycarbonate copolymer, comprising a structure formed of a repeating unit represented by formula (100):

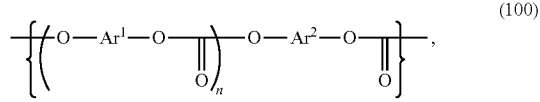
(100)

wherein:
a molar copolymer composition represented by $Ar^1/(Ar^1+Ar^2)$ is in a range of 50 mol % to 67 mol %;
a reduced viscosity [ηsp/C] of the polycarbonate copolymer is in a range of 0.60 dl/g to 4.0 dl/g;
a ratio of a hydroxyl group at all ends is 20 mol % or less;
$Ar^2$ represents a divalent group having an aromatic group;
$Ar^1$ represents a group represented by the following formula (2):

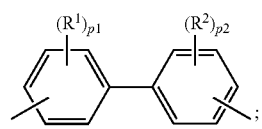
(2)

chain ends are terminated by a monovalent aromatic group or a monovalent fluorine-containing aliphatic group;
n represents an average repeating number of an $Ar^1$ block and is a numeral of 1.0 to 1.99; and
$Ar^1$ and $Ar^2$ are not the same,
$R^1$ and $R^2$ each represent a halogen atom, a trifluoromethyl group, an alkyl group having 1 to 12 carbon atoms, a substituted or unsubstituted aryl group having 6 to 12 ring carbon atoms, an alkoxy group having 1 to 12 carbon atoms, a substituted or unsubstituted aryloxy group having 6 to 12 ring carbon atoms, or a substituted or unsubstituted arylalkyl group having 7 to 20 carbon atoms;
p1 and p2 each represent an integer of 0 to 4; and
when the aromatic ring is substituted by two or more of $R^1$ or $R^2$ (p1, p2>2), the two or more of $R^1$ or $R^2$ are optionally different groups.

2. A polycarbonate copolymer, comprising a structure formed of a repeating unit represented by formula (1),

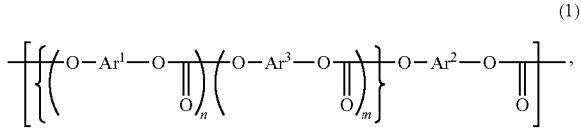
(1)

wherein:
a molar copolymer composition represented by $Ar^1/(Ar^1+Ar^2+Ar^3)$ is in a range of 47 mol % to 67 mol %;
a reduced viscosity [ηsp/C] is in a range of 0.60 dl/g to 4.0 dl/g;
a ratio of a hydroxyl group at all ends is 20 mol % or less;
$Ar^2$ and $Ar^3$ each represent a divalent group having an aromatic group;

Ar$^1$ represents a group represented by the following formula (2):

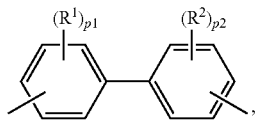

chain ends are terminated by a monovalent aromatic group or a monovalent fluorine-containing aliphatic group;

n represents an average repeating number of an Ar$^1$ block and is a numeral of 1.0 to 1.99;

m represents an average repeating number of an Ar$^3$ block and is a numeral of 1.0 to 4.0; and Ar$^2$ and Ar$^3$ are optionally the same or different, but Ar$^1$ is not the same as Ar$^2$ and Ar$^3$;

R$^1$ and R$^2$ each represent a halogen atom, a trifluoromethyl group, an alkyl group having 1 to 12 carbon atoms, a substituted or unsubstituted aryl group having 6 to 12 ring carbon atoms, an alkoxy group having 1 to 12 carbon atoms, a substituted or unsubstituted aryloxy group having 6 to 12 ring carbon atoms, or a substituted or unsubstituted arylalkyl group having 7 to 20 carbon atoms;

p1 and p2 each represent an integer of 0 to 4; and when the aromatic ring is substituted by two or more of R$^1$ or R$^2$ (p1, p2>2), the two or more of R$^1$ or R$^2$ are optionally different groups.

3. The polycarbonate copolymer according to claim 1, wherein

Ar$^2$ represents a group represented by at least one of the following formulae (3) and (4):

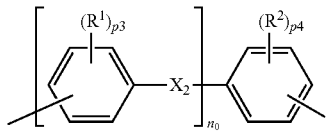

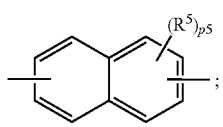

wherein:

X$_2$ represents —O—, —CO—, —S—, —SO—, —SO$_2$—, —CONH—, —CR$^6$R$^7$— in which R$^6$ and R$^7$ each independently represent a hydrogen atom, an alkyl group having 1 to 12 carbon atoms, a trifluoromethyl group or a substituted or unsubstituted aryl group having 6 to 12 ring carbon atoms, —O—R$^8$—O— in which R$^8$ is a carbonyl group, an alkyl chain having 1 to 6 carbon atoms, or a trifluoroalkyl chain and is optionally branched, a substituted or unsubstituted cycloalkylidene group having 5 to 12 ring carbon atoms, a substituted or unsubstituted adamantane-2,2-diyl group, a substituted or unsubstituted adamantane-1,3-diyl group, a substituted or unsubstituted α,ω-alkylene group having 2 to 12 carbon atoms, a substituted or unsubstituted 9,9-fluorenylidene group, a 1,8-menthanediyl group, a 2,8-menthanediyl group, a substituted or unsubstituted pyrazylidene group, or a substituted or unsubstituted arylene group having 6 to 12 ring carbon atoms;

R$^3$, R$^4$ and R$^5$ each represent a halogen atom, a trifluoromethyl group, an alkyl group having 1 to 12 carbon atoms, a substituted or unsubstituted aryl group having 6 to 12 ring carbon atoms, an alkoxy group having 1 to 12 carbon atoms, a substituted or unsubstituted aryloxy group having 6 to 12 ring carbon atoms, or a substituted or unsubstituted arylalkyl group having 7 to 20 carbon atoms;

p3 and p4 represents an integer of 0 to 4 and p5 represents an integer of 0 to 6;

a repeating unit number n$_0$ is in a range of 0 to 2, wherein R$^3$, p3 and X$_2$ are selected in each of the repeating unit;

when an aromatic ring is substituted by two or more of R$^3$ or R$^4$ (p3, p4>2), the two or more of R$^3$ or R$^4$ are optionally different groups; and when an aromatic ring is substituted by two or more of R$^5$ (p5>2), the two or more of R$^5$ are optionally different groups.

4. The polycarbonate copolymer according to claim 3, wherein:

Ar$^2$ is a group represented by the following formula (3'):

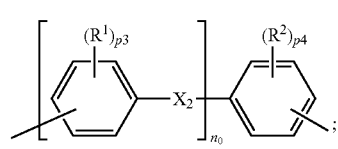

X$_2$ is —O—, —CR$^6$R$^7$— in which R$^6$ and R$^7$ each independently represent a hydrogen atom, an alkyl group having 1 to 12 carbon atoms, a trifluoromethyl group or a substituted or unsubstituted aryl group having 6 to 12 ring carbon atoms, a substituted or unsubstituted cycloalkylidene group having 5 to 12 ring carbon atoms, a substituted or unsubstituted adamantane-2,2-diyl group, a substituted or unsubstituted adamantane-1,3-diyl group, or a substituted or unsubstituted α,ω-alkylene group having 2 to 12 carbon atoms;

n$_0$ is 1; and

R$^3$, R$^4$, p3 and p4 are the same as those in the formula (3).

5. The polycarbonate copolymer according to claim 2, wherein:

Ar$^2$ and Ar$^3$ each are a group represented by at least one of the following formulae (3) and (4):

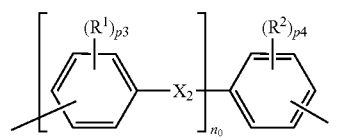

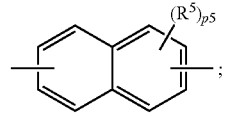

X$_2$ represents —O—, —CO—, —S—, —SO—, —SO$_2$—, —CONH—, —CR$^6$R$^7$— in which R$^6$ and R$^7$ each independently represent a hydrogen atom, an alkyl group having 1 to 12 carbon atoms, a trifluoromethyl group or a substituted or unsubstituted aryl group having 6 to 12 ring carbon atoms, —O—R⁸—O— in which R⁸ is a carbonyl group, an alkyl chain having 1 to 6 carbon atoms, or a trifluoroalkyl chain and is optionally branched, a substituted or unsubstituted cycloalkylidene group having 5 to 12 ring carbon atoms, a substituted or unsubstituted adamantane-2,2-diyl group, a substituted or unsubstituted adamantane-1,3-diyl group, a substituted or unsubstituted α,ω-alkylene group having 2 to 12 carbon atoms, a substituted or unsubstituted 9,9-fluorenylidene group, a 1,8-menthanediyl group, a 2,8-menthanediyl group, a substituted or unsubstituted pyrazylidene group, or a substituted or unsubstituted arylene group having 6 to 12 ring carbon atoms;

$R^3$, $R^4$ and $R^5$ each represent a halogen atom, a trifluoromethyl group, an alkyl group having 1 to 12 carbon atoms, a substituted or unsubstituted aryl group having 6 to 12 ring carbon atoms, an alkoxy group having 1 to 12 carbon atoms, a substituted or unsubstituted aryloxy group having 6 to 12 ring carbon atoms, or a substituted or unsubstituted arylalkyl group having 7 to 20 carbon atoms;

p3 and p4 represents an integer of 0 to 4 and p5 represents an integer of 0 to 6;

a repeating unit number $n_0$ is in a range of 0 to 2, wherein $R^3$, p3 and $X_2$ are selected in each of the repeating unit;

when an aromatic ring is substituted by two or more of $R^3$ or $R^4$ (p3, p4≥2), the two or more of $R^3$ or $R^4$ are optionally different groups; and when an aromatic ring is substituted by two or more of $R^5$ (p5≥2), the two or more of $R^5$ are optionally different groups.

6. The polycarbonate copolymer according to claim 5, wherein:

$Ar^2$ and $Ar^3$ each are a group represented by formula (3'):

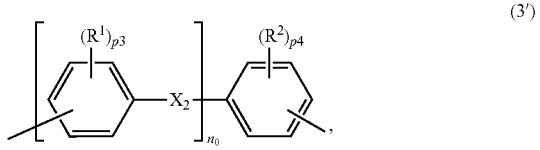

(3')

wherein:

$X_2$ represents —O—, —CR⁶R⁷— in which R⁶ and R⁷ each independently represent a hydrogen atom, an alkyl group having 1 to 12 carbon atoms, a trifluoromethyl group or a substituted or unsubstituted aryl group having 6 to 12 ring carbon atoms, a substituted or unsubstituted cycloalkylidene group having 5 to 12 ring carbon atoms, a substituted or unsubstituted adamantane-2,2-diyl group, a substituted or unsubstituted adamantane-1,3-diyl group, or a substituted or unsubstituted α,ω-alkylene group having 2 to 12 carbon atoms;

$n_0$ is 1; and $R^3$, $R^4$, p3 and p4 are the same as those in the formula (3).

7. The polycarbonate copolymer according to claim 6, wherein $Ar^2$ and $Ar^3$ are the same group.

8. The polycarbonate copolymer according to claim 1, further comprising:

a divalent organic siloxane modified phenylene group for $Ar^2$.

9. The polycarbonate copolymer according to claim 8, wherein:

the divalent organic siloxane modified phenylene group is a group represented by formula (3A) or (3B):

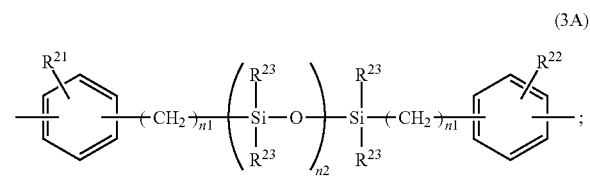

(3A)

$R^{21}$ and $R^{22}$ each independently represent a hydrogen atom, a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 ring carbon atoms;

$R^{23}$ each independently represents a substituted or unsubstituted alkyl group having 1 to 12 carbon atoms or a substituted or unsubstituted aryl group having 6 to 12 ring carbon atoms;

n1 is an integer of 2 to 4; and n2 is an integer of 1 to 600, or

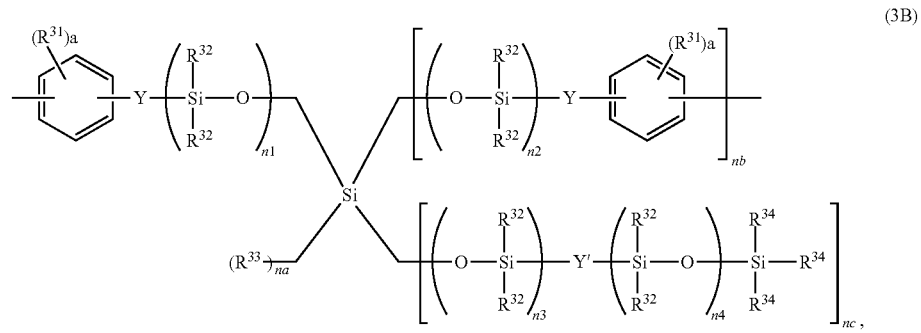

(3B)

wherein:

$R^{31}$ each independently represents a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 ring carbon atoms;

$R^{32}$ each independently represents a substituted or unsubstituted alkyl group having 1 to 12 carbon atoms or a substituted or unsubstituted aryl group having 6 to 12 ring carbon atoms;

$R^{33}$ represents a monovalent hydrocarbon group having no aliphatic unsaturated bond, the monovalent hydrocarbon being the same or different;

$R^{34}$ represents a monovalent hydrocarbon group having no aliphatic unsaturated bond, the monovalent hydrocarbon group being the same or different;

Y and Y' are an alkylene group having 2 or more carbon atoms, alkyleneoxyalkylene group or an oxygen atom;

na is 0 or 1, nb is 1 or 2, and nc is 1 or 2, with the proviso that na+nb+nc=3;

n1 to n4 each represent an integer of 0 or more, with the proviso that a sum of n1, n2, n3 and n4 is an integer of 2 to 600, and a sum of n3 and n4 is an integer of 1 or more; and a is an integer of 0 to 4.

10. The polycarbonate copolymer according to claim 1, wherein $Ar^1$ represented by the formula (2) is a divalent group derived from a group selected from 4,4'-biphenol and 3,3'-dimethyl-4,4'-biphenol.

11. A manufacturing method of a polycarbonate copolymer, the method comprising reacting a bischloroformate oligomer represented by formula (5) or a combination of formulae (5) and (6) with a divalent phenol monomer represented by formula (7) in the presence of an acid binding agent:

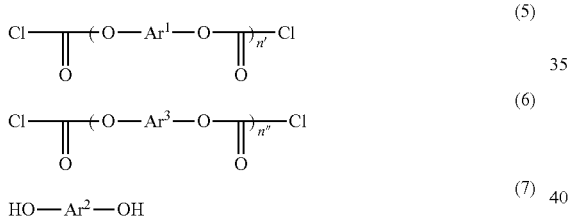

(5)

(6)

HO—$Ar^2$—OH   (7)

wherein:

when a mole number of the bischloroformate oligomer is represented by Mc (mol), a mole number of the divalent phenol monomer is represented by Mp (mol), a mole number of the acid binding agent is represented by Mo (mol), and a valence of the acid binding agent is represented by Y, an acid binding value X represented by the following formula is in a range of 1.1 to 1.3:

X=Mo·Y/(2Mc−2Mp), $Ar^1$ is a group represented by formula (2):

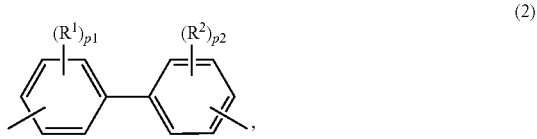

(2)

$Ar^2$ and $Ar^3$ are a divalent group having an aromatic group; $Ar^2$ and $Ar^3$ are optionally the same or different, but $Ar^1$ is not the same as $Ar^2$ and $Ar^3$;

n' is a numeral of 1.0 to 1.99;

n" is 0 or a numeral of 1.0 to 4.0;

$R^1$ and $R^2$ each represent a halogen atom, a trifluoromethyl group, an alkyl group having 1 to 12 carbon atoms, a substituted or unsubstituted aryl group having 6 to 12 ring carbon atoms, an alkoxy group having 1 to 12 carbon atoms, a substituted or unsubstituted aryloxy group having 6 to 12 ring carbon atoms, or a substituted or unsubstituted arylalkyl group having 7 to 20 carbon atoms;

p1 and p2 each represent an integer of 0 to 4; and when the aromatic ring is substituted by two or more of $R^1$ or $R^2$ (p 1, p2≥2), the two or more of $R^1$ or $R^2$ are optionally different groups.

12. A coating liquid, comprising:

the polycarbonate copolymer according to claim 1; and an organic solvent.

13. A coating liquid, comprising:

the polycarbonate copolymer manufactured by the manufacturing method of claim 11; and an organic solvent.

14. An electrophotographic photoreceptor, comprising:

a conductive substrate; and a photosensitive layer provided on the conductive substrate, wherein the photosensitive layer comprises the polycarbonate copolymer according to claim 1.

15. An electrophotographic photoreceptor, comprising:

a conductive substrate; and a photosensitive layer provided on the conductive substrate, wherein the photosensitive layer comprises the polycarbonate copolymer manufactured by the manufacturing method of claim 11.

16. The polycarbonate copolymer according to claim 2, further comprising:

a divalent organic siloxane modified phenylene group for $Ar^2$.

17. The polycarbonate copolymer according to claim 16, wherein:

the divalent organic siloxane modified phenylene group is a group represented by formula (3A) or (3B):

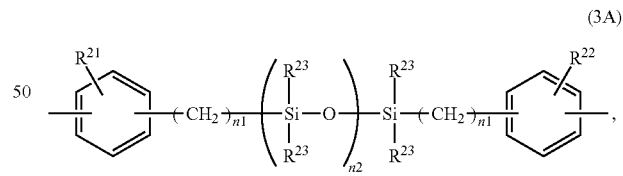

(3A)

$R^{21}$ and $R^{22}$ each independently represent a hydrogen atom, a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 ring carbon atoms;

$R^{23}$ each independently represents a substituted or unsubstituted alkyl group having 1 to 12 carbon atoms or a substituted or unsubstituted aryl group having 6 to 12 ring carbon atoms;

n1 is an integer of 2 to 4; and n2 is an integer of 1 to 600, or

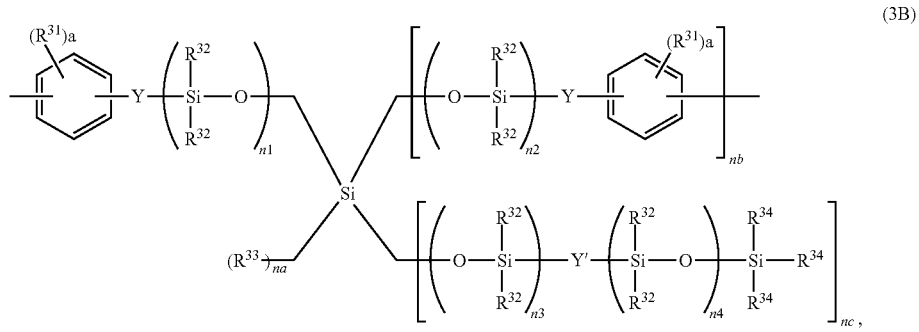
(3B)

R³¹ each independently represents a halogen atom, a substituted or unsubstituted alkyl group having 1 to 12 carbon atoms, a substituted or unsubstituted alkoxy group having 1 to 12 carbon atoms or a substituted or unsubstituted aryl group having 6 to 12 ring carbon atoms;

R³² each independently represents a substituted or unsubstituted alkyl group having 1 to 12 carbon atoms or a substituted or unsubstituted aryl group having 6 to 12 ring carbon atoms;

R³³ represents a monovalent hydrocarbon group having no aliphatic unsaturated bond, the monovalent hydrocarbon being the same or different;

R³⁴ represents a monovalent hydrocarbon group having no aliphatic unsaturated bond, the monovalent hydrocarbon group being the same or different;

Y and Y' are an alkylene group having 2 or more carbon atoms, alkyleneoxyalkylene group or an oxygen atom;

na is 0 or 1, nb is 1 or 2, and nc is 1 or 2, with the proviso that na+nb+nc=3;

n1 to n4 each represent an integer of 0 or more, with the proviso that a sum of n1, n2, n3 and n4 is an integer of 2 to 600, and a sum of n3 and n4 is an integer of 1 or more; and a is an integer of 0 to 4.

18. The polycarbonate copolymer according to claim 2, wherein Ar¹ represented by the formula (2) is a divalent group derived from a group selected from 4,4'-biphenol and 3,3'-dimethyl-4,4'-biphenol.

19. A coating liquid, comprising:
the polycarbonate copolymer according to claim 2; and
an organic solvent.

20. An electrophotographic photoreceptor, comprising:
a conductive substrate; and
a photosensitive layer provided on the conductive substrate,
wherein the photosensitive layer comprises the polycarbonate copolymer according to claim 2 as a component.

* * * * *